US006769466B2

(12) United States Patent
Osumi et al.

(10) Patent No.: US 6,769,466 B2
(45) Date of Patent: Aug. 3, 2004

(54) LAMINATING APPARATUS AND METHOD FOR MANUFACTURING LAMINATED ARTICLE

(75) Inventors: Kiyotaka Osumi, Kanagawa (JP); Taku Yokozawa, Kanagawa (JP); Hitoshi Kobayashi, Nagano (JP); Yasushi Hori, Nagano (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 09/990,306

(22) Filed: Nov. 23, 2001

(65) Prior Publication Data

US 2002/0074090 A1 Jun. 20, 2002

(30) Foreign Application Priority Data

Nov. 30, 2000 (JP) ........................................ 2000/364481

(51) Int. Cl.[7] .............................. B26D 5/26; B32B 31/20
(52) U.S. Cl. ........................ 156/351; 156/352; 156/353; 156/361; 156/364
(58) Field of Search ................................. 156/351, 352, 156/353, 358, 359, 361, 362, 363, 364, 366, 367, 368, 387, 522, 555, 582, 583

(56) References Cited

FOREIGN PATENT DOCUMENTS

JP          2000-43368          2/2000

Primary Examiner—Richard Crispino
Assistant Examiner—George R. Koch, III
(74) Attorney, Agent, or Firm—Fitzpatrick, Cella, Harper & Scinto

(57) ABSTRACT

A laminating apparatus for laminating a film on a record medium includes a fixing unit for fixing a film onto a front side of a record medium, a feed unit for feeding the record medium to the fixing unit, a film introducing unit for directing the film to the fixing unit, and a conveying unit for conveying toward a discharge port the record medium and the film which are fixed together by the fixing unit. A cutter is disposed between the conveying unit and the discharge port and adapted to cut the film, and a control unit having a repeat mode is provided in which the conveying unit is stopped in a condition that a preceding record medium leaves the fixing unit and the feed unit is driven to feed a succeeding record medium toward the fixing unit. The fixing unit and the conveying unit are driven again before a leading end of the succeeding record medium reaches the fixing unit, while the succeeding record medium and the introduced film are fixed together as discharging the preceding record medium from the discharge port.

16 Claims, 19 Drawing Sheets

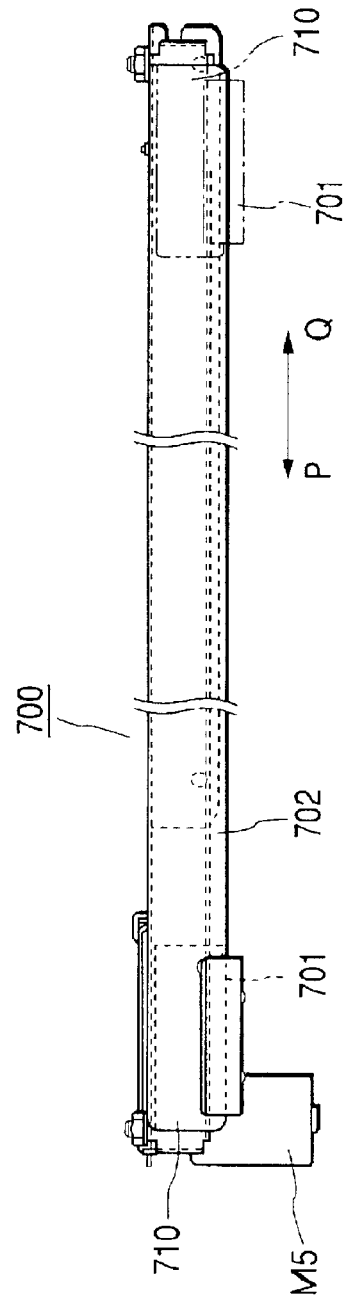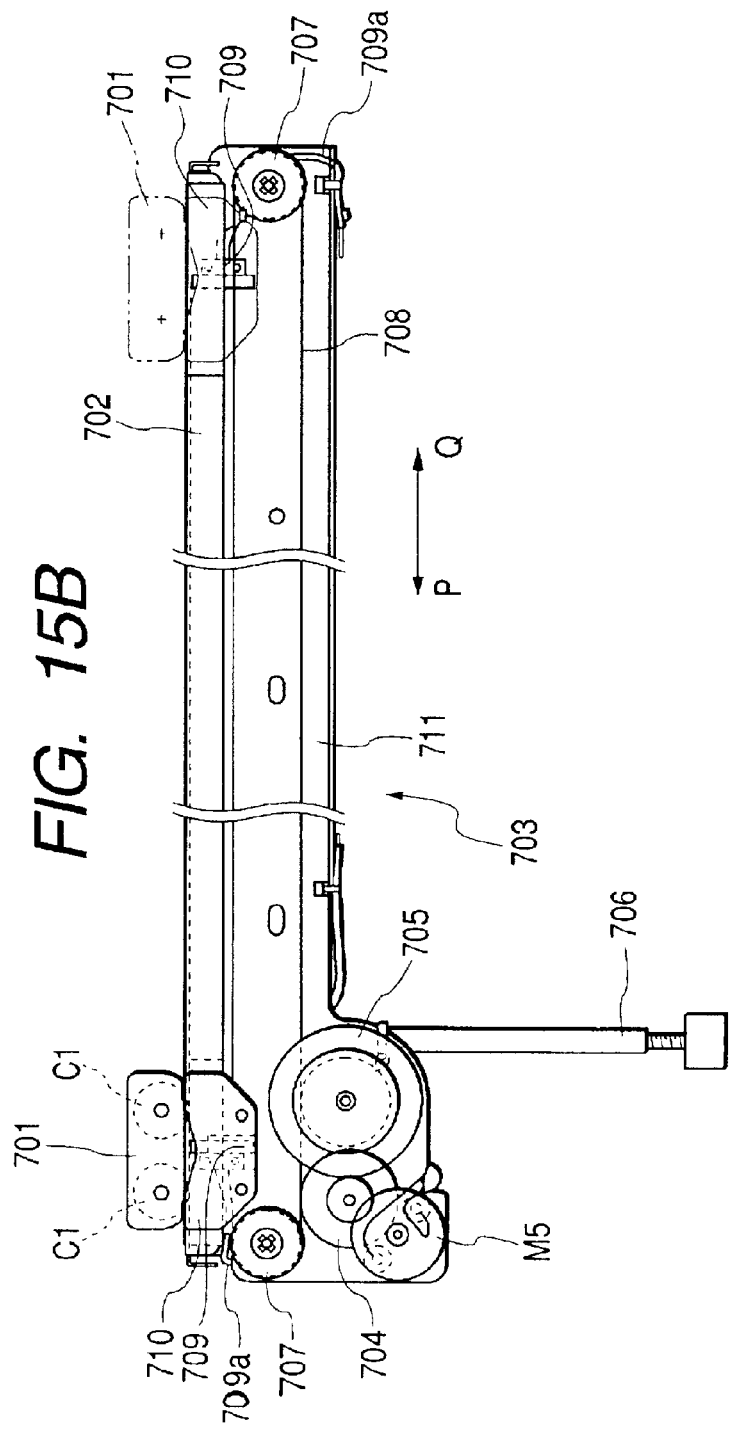

LAMINATING APPARATUS AND METHOD FOR MANUFACTURING LAMINATED ARTICLE

BACKGROUND OF THE INVENTION

1. Field of the Invention

The present invention relates to a laminating apparatus for fixing a film onto a record medium on which an image was formed by an ink jet printer, a printing apparatus, a copying machine and the like in order to protect a recorded image layer of the medium, and more particularly, it relates to a laminating apparatus and a method for manufacturing a laminated article, suitable for being applied to a large system used for producing posters and the like.

2. Related Background Art

In the past, for example, as disclosed in Japanese Application Laid-Open No. 2000-043368, there is known a laminating apparatus in which a film comprised of a heat-resistive substrate and a latex layer coated on the substrate is fixed onto a recorded image surface of a record paper outputted from an ink jet printer and the like and color saturation and endurance of the image are improved by peeling the heat-resistive substrate later.

In such a laminating apparatus, a rolled paper (record medium) and a rolled film (protecting member) are sent together by a pair of convey rollers, and a recorded surface of the record paper and a latex surface of the protecting member are heated and urged (or pressurized) against each other by a pair of heat rollers so that the latex surface of the protecting member is fused and closely adhered onto the record surface of the record paper, thereby forming an image protecting surface. Then, the substrate is peeled and separated from the protecting member and is taken up by a take-up roller. Thereafter, the record paper with the image protecting surface is cut by a cutter, so that the cut paper is discharged onto a discharge tray as a sheet-shaped print.

However, in such a conventional laminating apparatus, after the film is fixed to the record medium, the record medium to which the film was fixed is conveyed toward a discharge port. At that time, since the film is rolled, the film is drawn toward the discharge port until the film is cut, as the record medium is conveyed.

If a distance between the fixing means and the discharge port is long, an amount of the film drawn by conveyance of the record medium is increased, thereby worsening use efficiency of the film. When the use efficiency of the film is worsened, cost is increased and saving of resources is reduced.

SUMMARY OF THE INVENTION

The present invention is made in consideration of the above-mentioned conventional circumstances, and an object of the present invention is to provide a laminating apparatus and a method for manufacturing a laminated article, in which a film can be used efficiently.

Another object of the present invention is to provide a laminating apparatus and a method for manufacturing a laminated article, in which a preceding record medium and a film can be cut in a conveying condition while fixing the film onto a succeeding record medium.

A further object of the present invention is to provide a laminating apparatus and a method for manufacturing a laminated article, in which one of a pair of rollers for pressurizing and heating a record medium and a film is provided with a heat source, and the one roller can be shifted to be spaced apart from the other roller so that the one roller can be held to not be in contact with the film.

A still further object of the present invention is to provide a laminating apparatus which has a unit-of-sheet mode in which a record medium is fed by feed means and an introduced film is fixed onto the record medium by fixing means, and the fixed record medium and the film are conveyed by conveying means and are cut by a cutter and a completed sheet is discharged from a discharge port.

A further object of the present invention is to provide a laminating apparatus in which a second sensor is disposed on a downstream side of fixing means for fixing a film to a record medium, and the second sensor has a first condition for detecting the fixed record medium and a film portion, a second condition for detecting the film portion on which the record medium does not exist, and a third condition for detecting the fact that both the record medium and the film do not exist.

The other object of the present invention is to provide a laminating apparatus comprising fixing means for fixing a film onto a front side of a record medium, feed means for feeding the record medium to the fixing means, film introducing means for directing the film to the fixing means, conveying means for conveying toward a discharge port the record medium and the film which are fixed together by the fixing means, a cutter disposed between the conveying means and the discharge port and adapted to cut the film, and a control unit having a repeat mode in which the conveying means is stopped in a condition that a preceding record medium leaves the fixing means and the feed means is driven to feed a succeeding record medium toward the fixing means, and then the fixing means and the conveying means are driven again before a leading end of the succeeding record medium reaches the fixing means, while the succeeding record medium and the introduced film are fixed together as discharging the preceding record medium from the discharge port.

BRIEF DESCRIPTION OF THE DRAWINGS

FIGS. 15A and 15B are plan and rear views showing a cutter portion of the laminating apparatus according to the embodiment of the present invention, respectively;

FIG. 16A is a sectional view showing the film, FIG. 16B is a sectional view showing the record medium, FIG. 16C is a sectional view showing a condition that the film and the record medium are adhered to each other, and FIG. 16D is a sectional view showing a condition that the film and the record medium are adhered to each other and a protecting member of the film is peeled and removed;

DESCRIPTION OF THE PREFERRED EMBODIMENTS

The present invention will now be fully explained in connection with embodiments thereof with reference to the accompanying drawings.

Figure 16A:
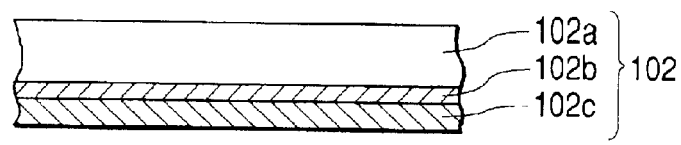
FIGS. 16A, 16B, 16C and 16D are views showing a film and a record medium in the laminating apparatus according to the embodiment of the present invention, where
Figure 16B:
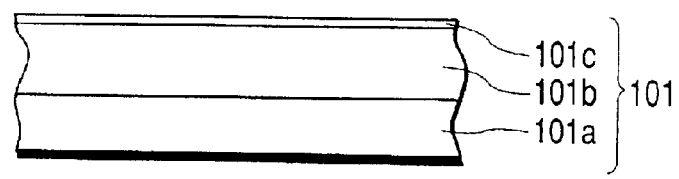
Figure 16C:
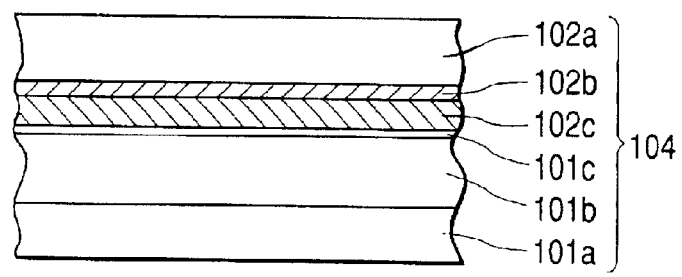
Figure 16D:
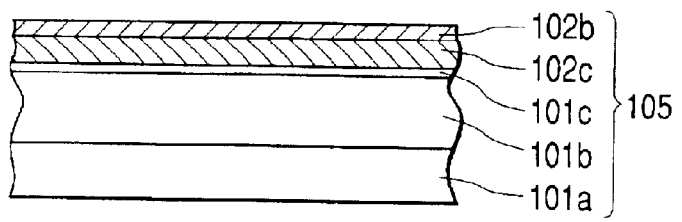

First of all, a film and a record medium applied to a laminating apparatus according to the present invention will be explained with reference to FIGS. 16A to 16D. The record medium used here is a medium on which an image was previously recorded by a recording apparatus such as a recording apparatus using an ink jet recording head. The record medium on which the image was recorded is supplied to the laminating apparatus manually or by appropriate conveying means. FIGS. 16A to 16D are views showing the film and the record medium, where FIG. 16A is a sectional view showing a film 102, FIG. 16B is a sectional view showing a record medium 101, FIG. 16C is a sectional view showing a condition that the film and the record medium are adhered to each other, and FIG. 16D is a sectional view showing a condition that the film and the record medium are adhered to each other and a protecting member of the film is peeled and removed.

In FIG. 16A, the film 102 is constituted by a film substrate 102a, a first latex layer 102b and a second latex layer 102c. The film substrate 102a may have excellent heat-resistance and is made of PET (polyethylene terephthalate), for example.

The first latex layer 102b is obtained b coating latex material on the film substrate 102a so that the first latex layer is physically adhered to the film substrate 102a to be easily peeled from the film substrate 102a after thermal adhesion (or being heated and pressurized) in order to form a surface layer of a protection layer of a laminated article.

The second latex layer 102c is obtained by further coating latex material on the first latex layer 102b and has an adhesion function for thermal adhesion onto a surface of the record medium 101 (described later). Further, the second latex layer 102c has a function for enhancing a sealing ability to be fused in the thermal adhesion thereby to adapt itself to unevenness of the record medium 101.

In FIG. 16B, the record medium 101 is constituted by a base member 101a, an ink absorbing layer 101b and a third latex layer 101c. Although the base member 101a is normally formed from paper, it may be formed from a sheet layer made of PET. The ink absorbing layer 101b includes at least silica particles and binder for binding the particles. Further, a thickness of the ink absorbing layer 101b is selected to an optimum value in accordance with the base member 101a.

The third latex layer 101c is obtained by coating latex material on the ink absorbing layer 101b and is formed as a relatively thin layer so that, when the ink is included in the ink absorbing layer 101b, the inclusion of ink is not prevented.

When the record medium 101 and the film 102 are fixed together by fixing rollers (described later), as shown in FIG. 16C, the second latex layer 102c and the third latex layer 101c are closely contacted with each other, thereby forming a laminated article 104. As shown in FIG. 16D, when the film substrate 102a of the laminated article 104 is peeled manually for example, a laminated article 105 in which the surface of the record medium 101 is protected by a protection layer comprised of the first latex layer 102b and the second latex layer 102c is obtained.

Figure 1:
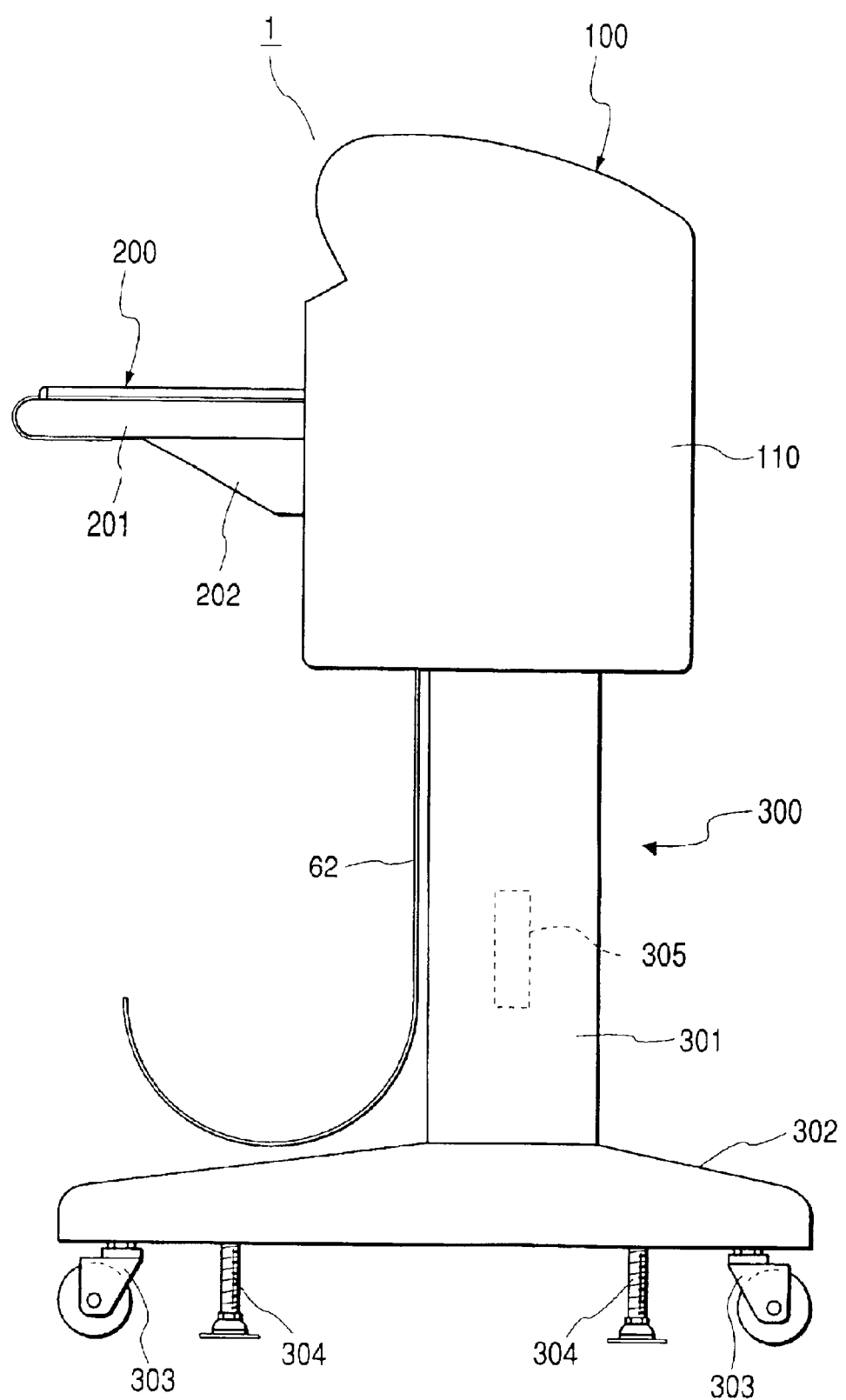
FIG. 1 is a side view showing a laminating. apparatus according to an embodiment of the present invention.

Next, a construction of the laminating apparatus according to the present invention will be explained with reference to the accompanying drawings. FIG. 1 is a side view showing the laminating apparatus according to the present invention, FIG. 2 is a front view of the laminating apparatus, and FIG. 3 is a plan view of the laminating apparatus.

Figure 2:
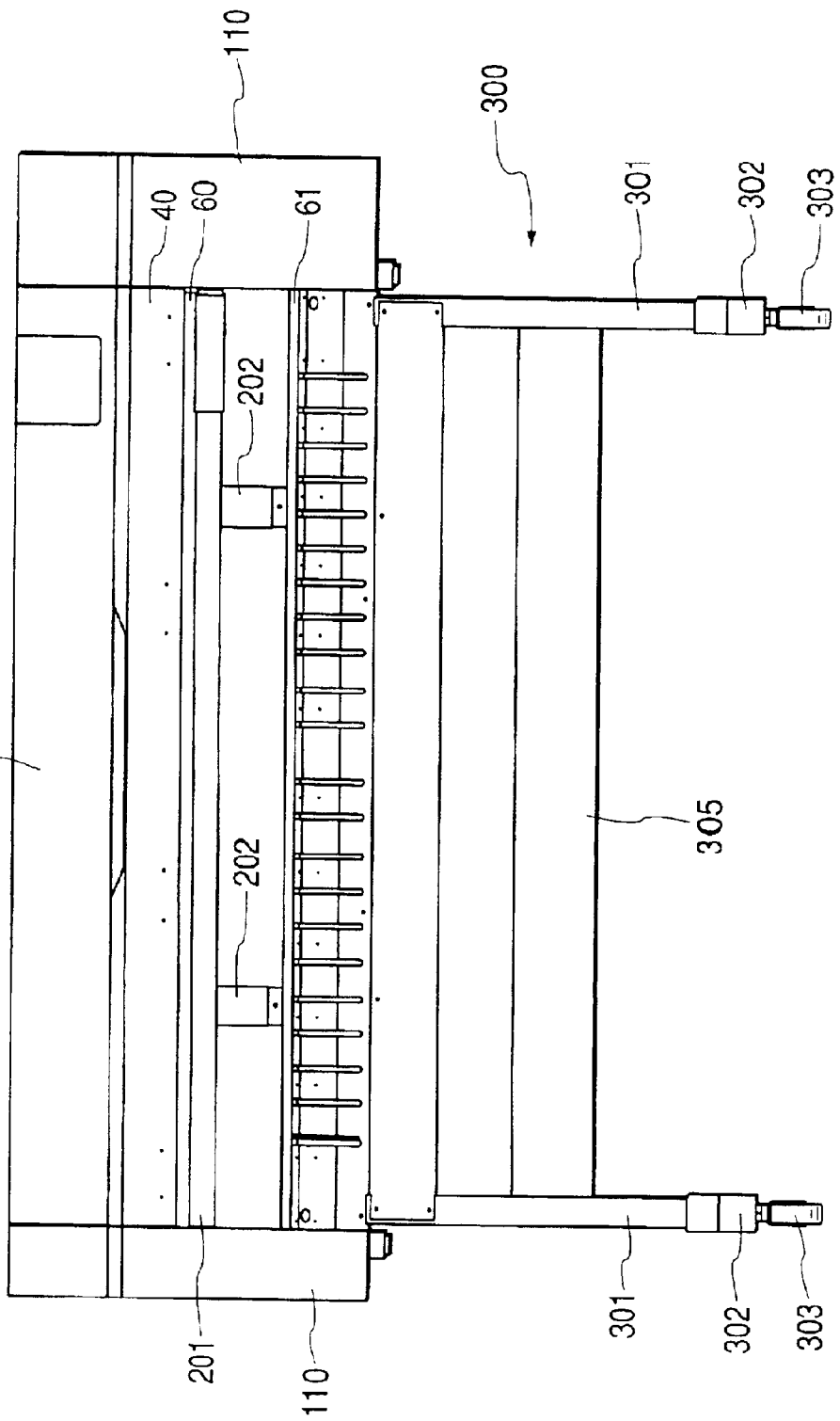
FIG. 2 is a front view showing the laminating apparatus according to the embodiment of the present invention.
Figure 3:
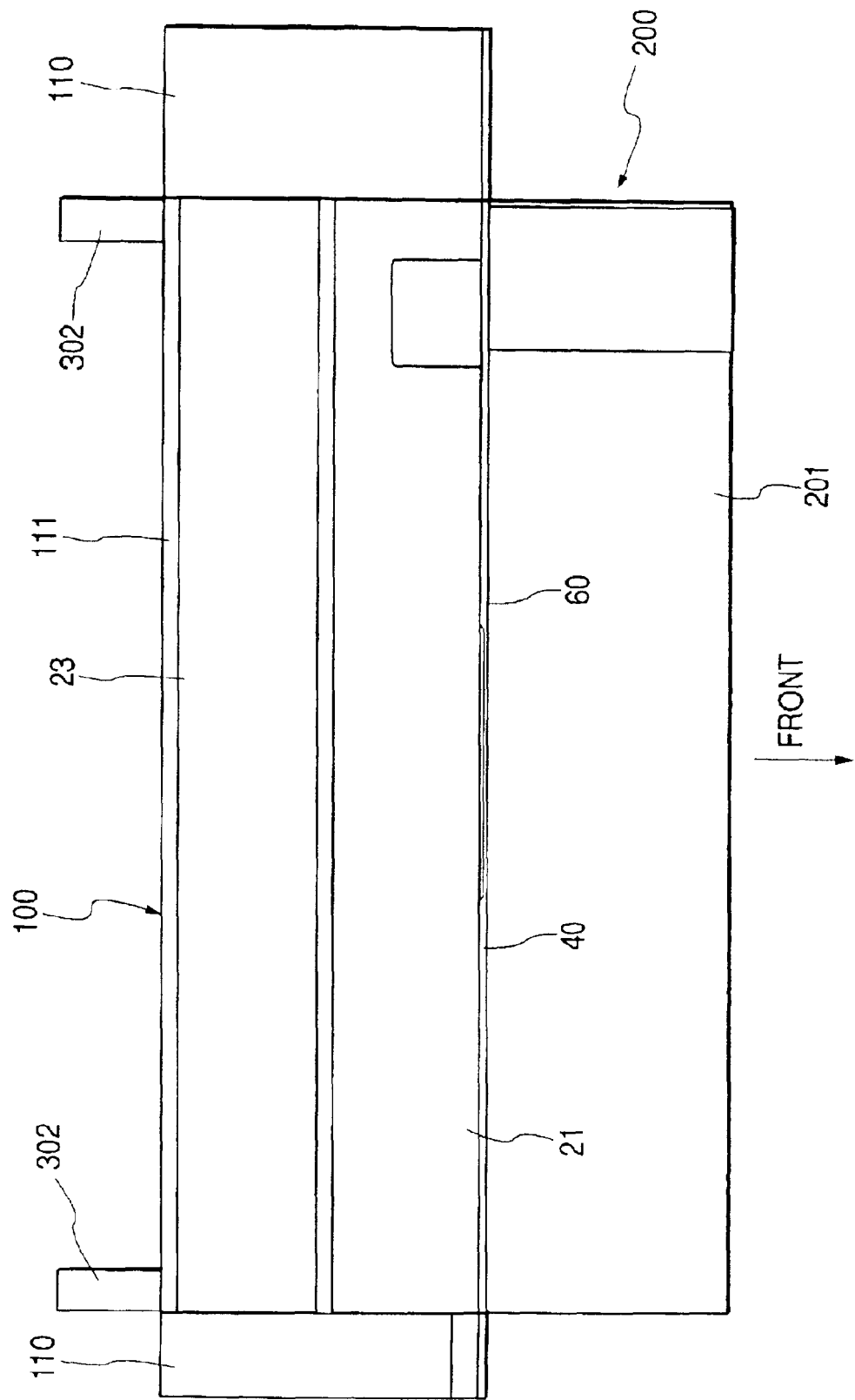
FIG. 3 is a plan view showing the laminating apparatus according to the embodiment of the present invention.

As shown in FIGS. 1 to 3, the laminating apparatus 1 is constituted by an apparatus body (main body) 100, a record medium supplying unit 200 and a body support 300. Sides of the main body 100 are covered by side cases 110 substantially entirely. Further, an upper front half side and an upper rear half side of the main body are covered by covers 21, 23, respectively, and an upper part of a rear side is covered by a rear case 111. The record medium supplying unit 200 is disposed at a front side of the main body, and the body support 300 is disposed at a lower side of the main body.

The record medium supplying unit 200 includes a supplying table 201 comprising a plate-shaped member for supplying the record medium having a surface on which the image was recorded, and a supplying table support plate 202 for supporting the supplying table 201. The body support 300 includes legs 301 attached to the lower side of the main body 100, leg receiving portions 302 arranged below the legs 301 and adapted to support loads from the legs 301, casters 303 arranged below the leg receiving portions 302 and permitting movement of the laminating apparatus 1, and fixing feet 304 arranged below the leg receiving portions 302 and adapted to fix the position of the laminating apparatus. Further, the legs 301 are provided at left and right ends of the main body, and the entire body support 300 is reinforced by securing a reinforcing plate 305 to the legs 301.

Incidentally, the main body 100 is provided at its upper surface with the cover 21 for covering a film mounting portion and is also provided with a front face unit 40 disposed at an upper side of the record medium supplying unit 200, and a supply port 60 is disposed below the front face unit 40. Further, in the vicinity of and ahead of the connections between the main body 100 and the legs 301, a stacking plate 62 having a substantially J-shaped side section is provided for stacking the laminate articles discharged toward the front side.

Figure 4:
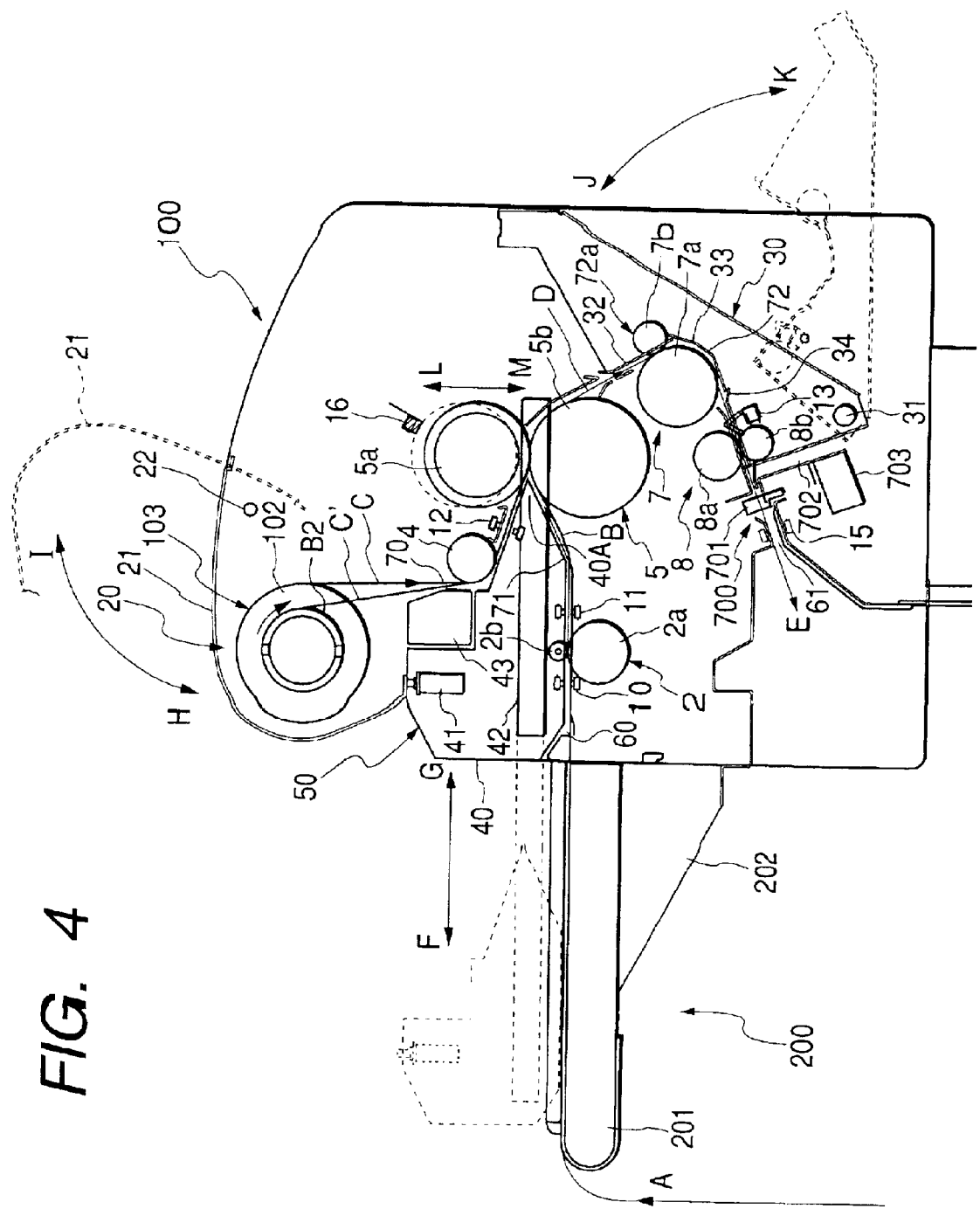
FIG. 4 is a sectional view showing an internal construction of an apparatus body of the laminating apparatus according to the embodiment of the present invention.

Next, an internal structure of the main body 100 which is a main part of the present invention will be explained with reference to the accompanying drawings. FIG. 4 is a sectional view showing the internal construction of the main body 100.

As shown in FIG. 4, within the main body 100, there are provided, in order from a front and upper part to a front and intermediate part, the film mounting portion 20 and a film set 103 mounted to the film mounting portion 20, the front face unit 40, the supply port 60 and a feed roller pair 2 as feeding means, and, a guide roller 4 and a pair of fixing rollers 5 are disposed about a center of the main body, and, there are provided, in order from a rear and lower part to a front and lower part, a pair of convey rollers 7, a pair of discharge rollers 8, a cutter unit 700 and a discharge port 61, and a rear face unit 30 is disposed at a rear and lower part of the convey roller pair 7 and the discharge roller pair 8.

The feed roller pair 2 includes a lower feed roller 2a and an upper feed roller 2b, and the fixing roller pair 5 includes an upper fixing roller 5a and a lower fixing roller 5b. Further, the convey roller pair 7 as conveying means includes a main convey roller 7a and a sub convey roller 7b, and the discharge roller pair 8 includes an upper discharge roller 8a and a lower discharge roller 8b.

Further, the main body 100 includes a film supplying path 70 through which the film 102 is supplied from the film mounting portion 20 to the fixing roller pair 5 through the guide roller 4 constituting film introducing means, a record medium supplying path 71 through which the record medium 101 is supplied from the supply port 60 below the front face unit 40 to the fixing roller pair 5 through the feed roller pair 2, and a convey path 72 for conveying the laminated article 104 from the fixing roller pair 5 to the discharge port 61 through the convey roller pair 7 and the discharge roller pair 8. The film supplying path 70, record medium supplying path 71 and conveying path 72 constitute a U-turn path for winding a conveyed member (member to be conveyed) around the lower fixing roller 5b and the main convey roller 7a at a predetermined angle.

In the vicinity of the feed roller pair 2, there are provided a feed sensor (detection sensor) 10 for detecting a leading end of the record medium 101 being conveyed, and a TA sensor 11 for detecting a trailing end of the record medium 101 and for detecting the fact that the feeding is finished. Incidentally, the feed sensor 10 and the TA sensor 11 constitute a first sensor.

A photo-sensor 12 for detecting the fact that the film 102 is being fed is disposed between the guide roller 4 and the fixing roller pair 5. Further, a film detection sensor 13 for detecting the fact that the film 102 continued from the film set 103 is being fed up to the discharge roller pair 8 is disposed between the convey roller pair 7 and the discharge roller pair 8. Further, in the vicinity of the discharge port 61, there is provided an exit (EXIT) sensor 15 as a second sensor having a first condition for detecting the laminated article 104 in which the record medium 101 and the film 102 are fixed together, a second condition for detecting the film 102 on which the record medium 101 does not exist, and a third condition for detecting the fact that both the record medium 102 and the film 101 do not exist, and this sensor serves to detect a trailing end of the laminated article 104 cut by the cutter unit 700.

The film mounting portion 20 within which the film set 103 is mounted is covered substantially entirely by the cover 21 having a generally U-shape when looked at from a side of the apparatus. The cover 21 has a rotatable fulcrum 22 (for example, comprising a pin or a bolt) behind the film mounting portion 20, so that the cover can be rotated around the fulcrum 22 in directions shown by the arrows H, I in FIG. 4. A condition shown by the sold line (H direction) shows the fact that the cover 21 is closed, and a condition shown by the broken line shows the fact that the cover 21 is rotated upwardly and opened. That is to say, in the condition that the cover 21 is opened, the film mounting portion 20 is released or opened toward forward and upward directions substantially entirely.

The front face unit 40 is disposed below the film mounting portion 20 and forms a part of a front outer wall of the main body 100 and has an acute angle portion 40A extending to a substantially center of the main body 100. An upper surface of the acute angle portion 40A of the front face unit 40 forms a bottom surface of the film supplying path 70, and a lower surface of the front face unit 40 includes the upper feed roller 2b and upper parts of the feed sensor 10 and the TA sensor 11 and entirely forms an upper surface of the record medium supplying path 71.

Further, the front face unit is provided at its upper side with a safety switch 41 and a grip 43. Further, the front face unit 40 is provided at its both ends (looked at from the front side of the apparatus) with rails 42, along which the front face unit can be shifted in directions shown by the arrows F, G. When the cover 21 is opened, the grip 43 can be grasped, so that, by manually pulling the grip 43 in the direction F, the front face unit can be shifted to a position shown by the broken line.

Further, in a condition (shown by the solid line) that the front face unit 40 is set in the main body 100, when the cover 21 is closed, the closure of the cover is detected by the safety switch 41, thereby permitting the operation of the laminating apparatus 1. Incidentally, in FIG. 4, the reference numeral 50 denotes an operation unit disposed at a front side of the main body 100.

The rear face unit 30 forms a part of a rear outer wall of the main body 100, and an inner surface 72a forms one side of the covey path 72 having a substantially L-shape when looked at from the side of the apparatus, and there are provided guide members 32, 33, 34 for guiding the laminated article 104 downwardly. Further, the inner wall surface 72a also includes the sub convey roller 7b, lower discharge roller 8b and film detection sensor 13.

Further, the rear face unit 30 is provided at its lower part with a fulcrum 31 comprising a pin or bolt for example, so that the unit can be rotated in directions shown by the arrows J, K. With this arrangement, by rotating the rear face unit in the direction K, the rear face unit can be shifted to a position shown by the broken line, thereby opening or releasing the rear side of the main body 100 from the vicinity of the convey roller pair 7 to the discharge roller pair 8.

Figure 5:
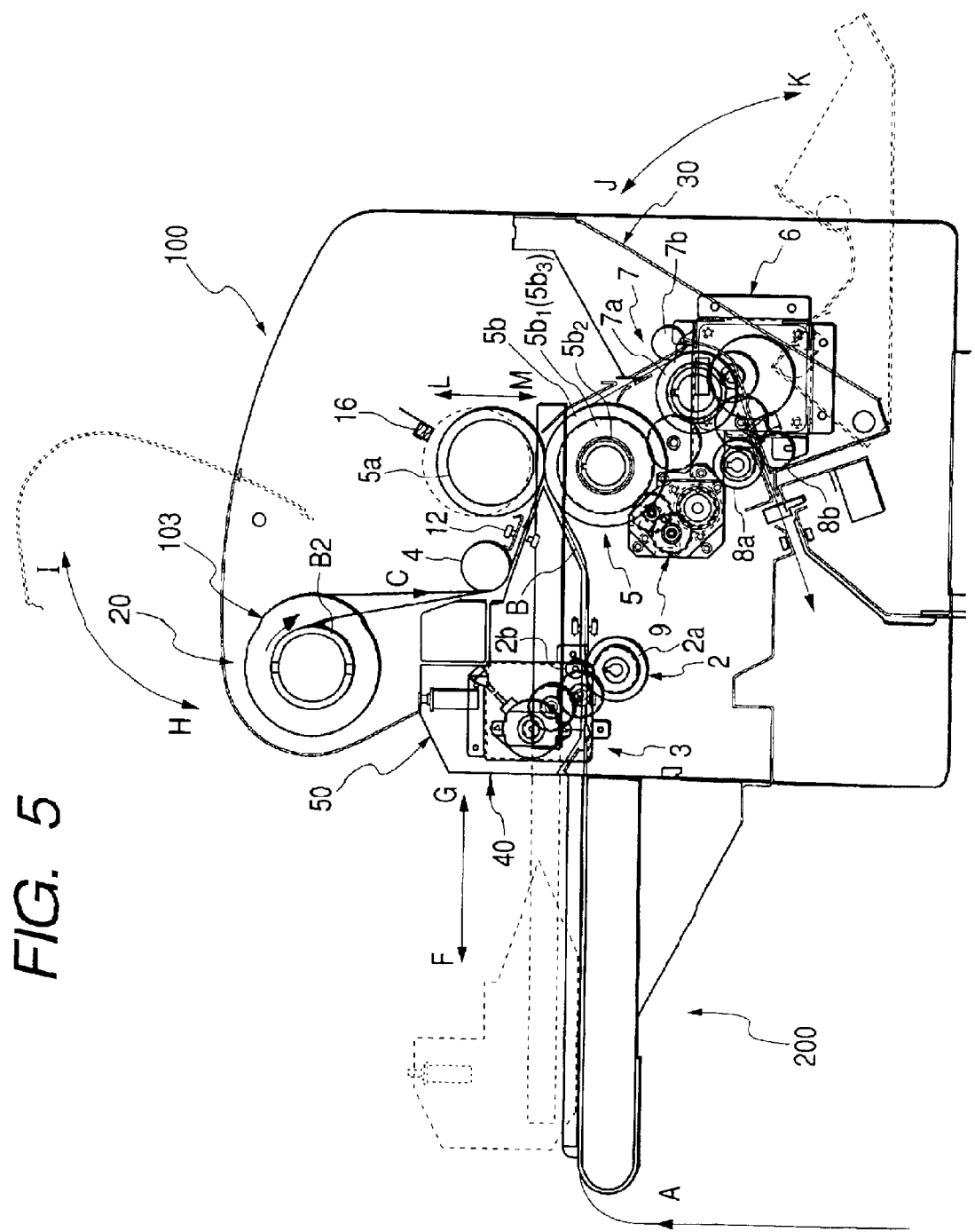
FIG. 5 is a sectional view showing a driving system of the laminating apparatus according to the embodiment of the present invention.

Next, a construction of a driving system for driving various rollers of the laminating apparatus will be explained with reference to the accompanying drawings. FIG. 5 is a sectional view showing the driving system of the laminating apparatus, and FIG. 6 is an enlarged sectional view showing a part of FIG. 5.

As shown in FIG. 5, a first drive controlling unit 3 is disposed at a side of the front face unit 40 and is adapted to be engaged by the feed roller pair 2 to effect drive control thereof. A second drive controlling unit 6 is disposed at a side of the rear face unit 30 and the convey roller pair 7 and is adapted to be engaged by the convey roller pair 7 to effect drive control thereof.

A brake unit 9 is disposed adjacent to the second drive controlling unit 6 at a front and lower side of the fixing roller pair 5 and is adapted to be engaged by the lower fixing roller 5b to effect brake control thereof. Further, a center shaft B2 of the film set 103 constitutes a brake to effect brake control of the film set 103 so that predetermined tension (for example, 0.0086 to 0.257 kg/cm) is always maintained between the film set 103 and the convey roller pair 7. Incidentally, the first drive controlling unit 3, second drive controlling unit 6 and brake unit 9 are disposed within side cases 110 not to be interfered with the movements of the front face unit 40 and the rear face unit 30.

Figure 6:
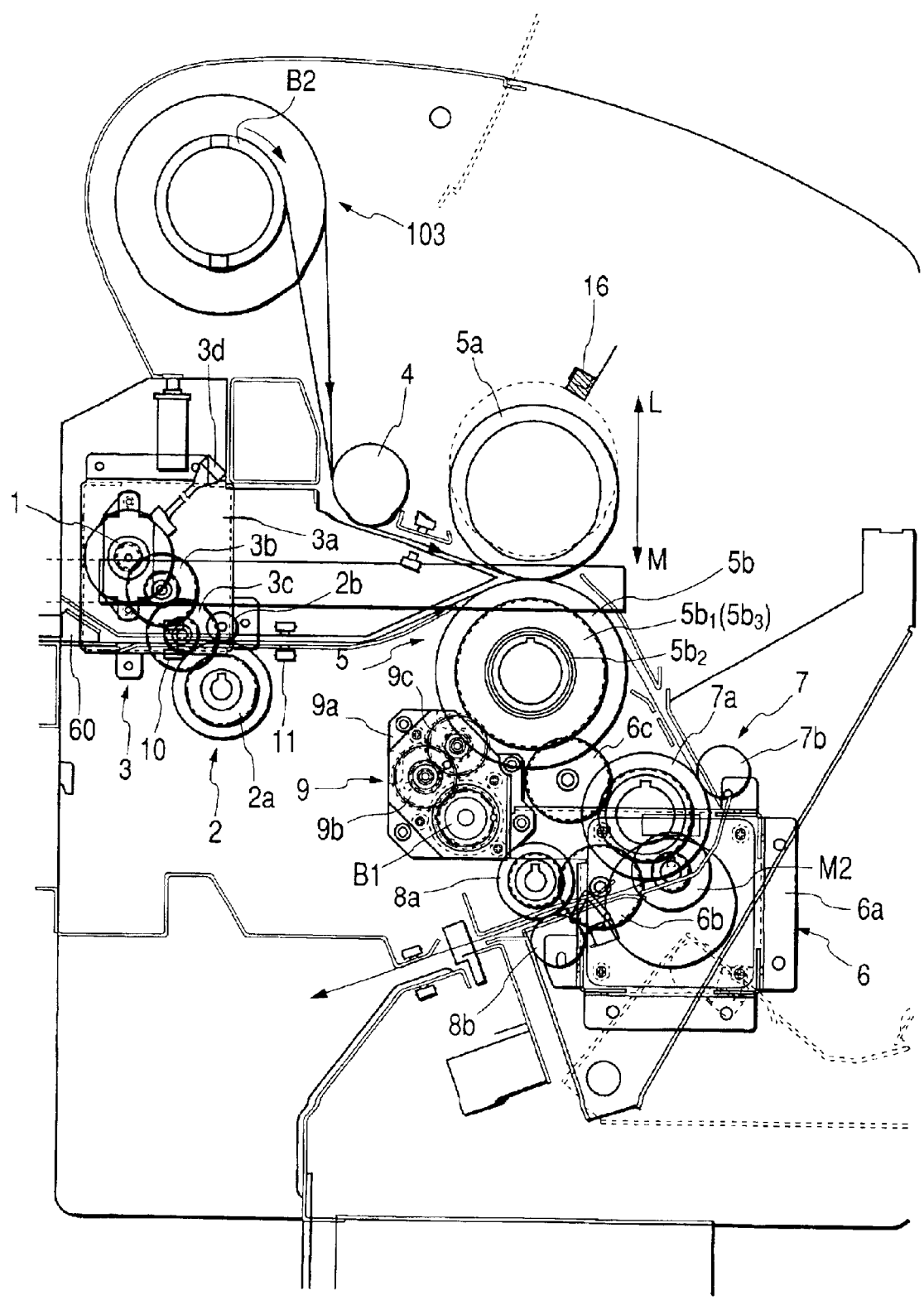
FIG. 6 is a sectional view showing a part of FIG. 5 in an enlarged scale.

As shown in FIG. 6, the first drive controlling unit 3 has a substrate 3a on which a motor M1 connected to a controller (not shown) of the main body via a wiring 3d is mounted. Incidentally, the controller will be described later with reference to FIG. 17. Further, a drive gear 3b engaged by the motor M1, and a drive gear 3c engaged by the drive gear 3b and the lower feed roller 2a are disposed on the substrate 3a. Namely, the motor M1 is synchronized with the feed roller pair 2.

The second drive controlling unit 6 has a substrate 6a, on which a motor M2 connected to the controller (not shown) is mounted. Further, the motor M2 on the substrate 6a is engaged by the main convey roller 7a. A drive gear 6b disposed on the substrate 6a is engaged by the main convey roller 7a and the upper discharge roller Ba so that the main convey roller 7a can be synchronized with the upper discharge roller 8a. Namely, the convey roller pair 7 and the discharge roller pair 8 are synchronized with each other to synchronize the motor M2 with the convey roller pair 7.

The brake unit 9 serves to maintain the predetermined tension on the film 102 or the laminated article 104 between the fixing roller pair 5 and the convey roller pair 7 and has a substrate 9a disposed adjacent to the substrate 6a of the second drive controlling unit 6, and a brake B1 is disposed on the substrate 9a.

Further, a drive gear disposed on the substrate 9a is engaged by the brake B1. Further, a one-way clutch $5b_2$ is disposed between a drive gear $5b_1$ of the roller and the lower fixing roller 5b. A drive gear 9c disposed on the substrate 9a is engaged by a drive gear $5b_3$ coaxial with the drive gear $5b_1$ of the roller. The drive gear $5b_3$ is fixed with respect to the roller by means of a key. Incidentally, the one-way clutch $5b_2$ serves to prevent excessive load on the laminated article 104 due to excessive brake control of the brake B1 and permits rotation in a rotational speed increasing direction.

On the other hand, a drive gear 6c is supported by the main body 100 between the lower fixing roller 5b and the main convey roller 7a, and the drive roller 6c is engaged by the drive gear $5b_1$ of the lower fixing roller 5b so as to drive the lower fixing roller 5b via the main convey roller 7a being driven by the motor M2.

Figure 7:
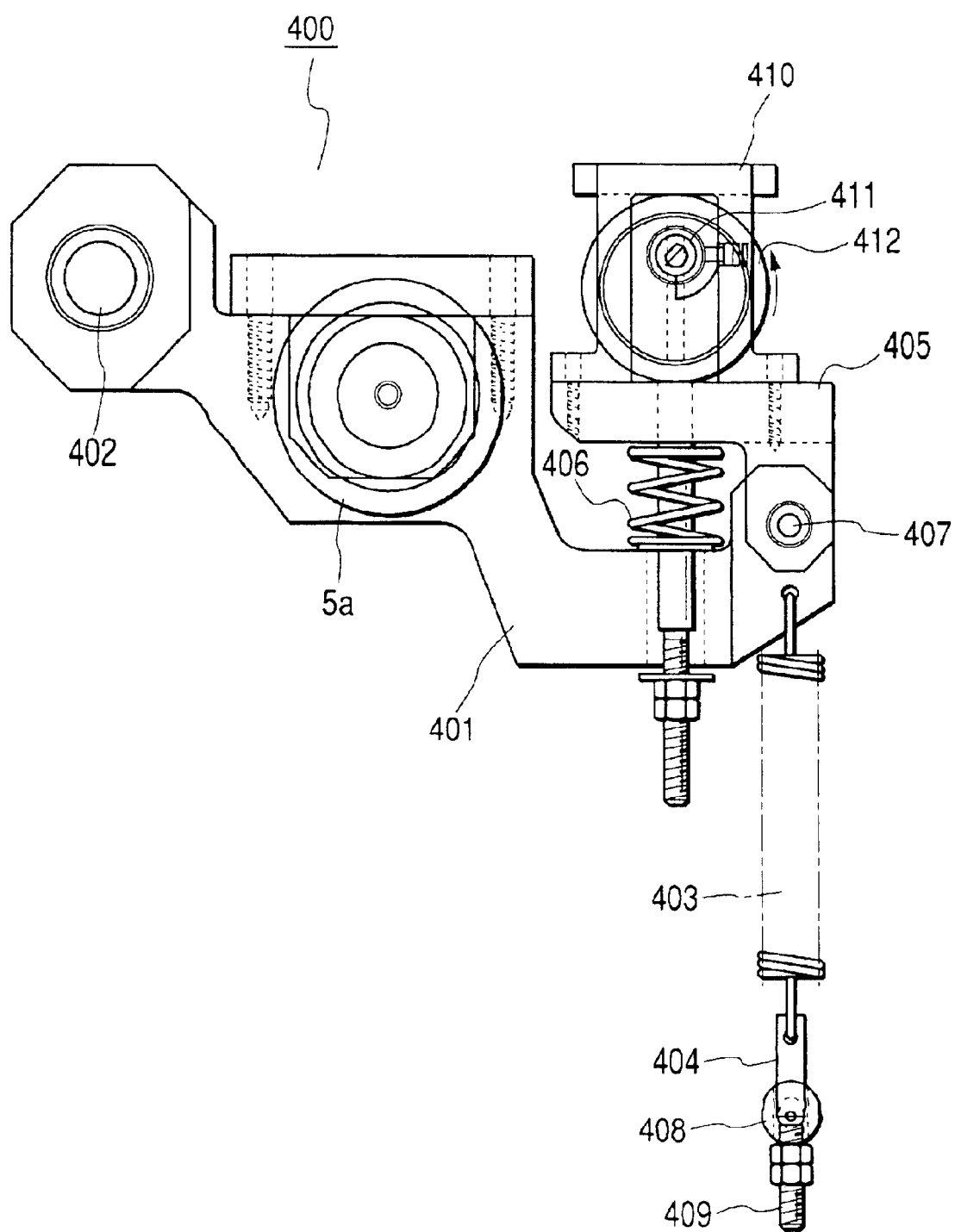
FIG. 7 is a side view showing a pressurizing mechanism for an upper fixing roller of the laminating apparatus according to the embodiment of the present invention.
Figure 8:
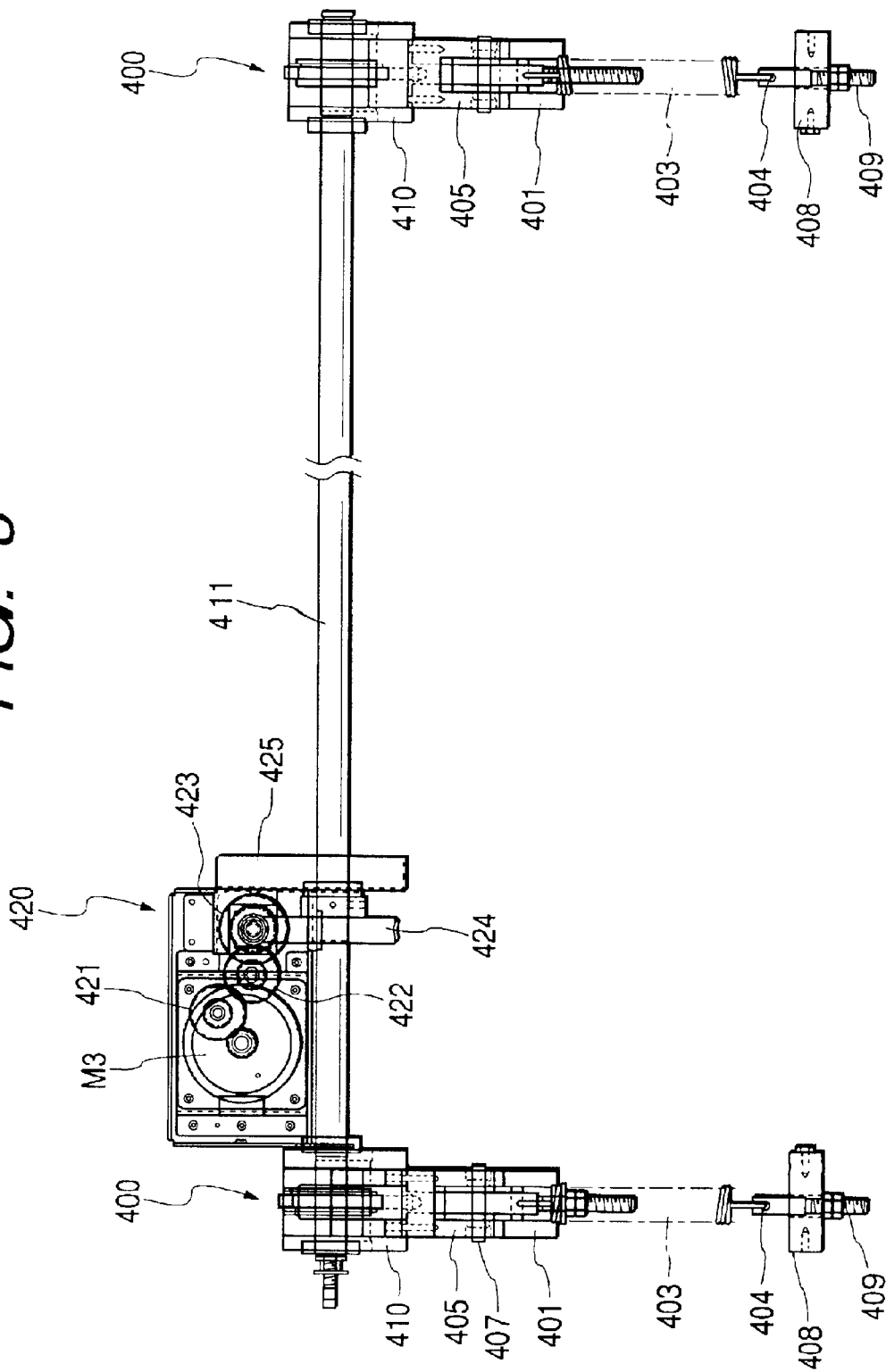
FIG. 8 is a rear view showing the pressurizing mechanism for the upper fixing roller of the laminating apparatus according to the embodiment of the present invention.
Figure 9:
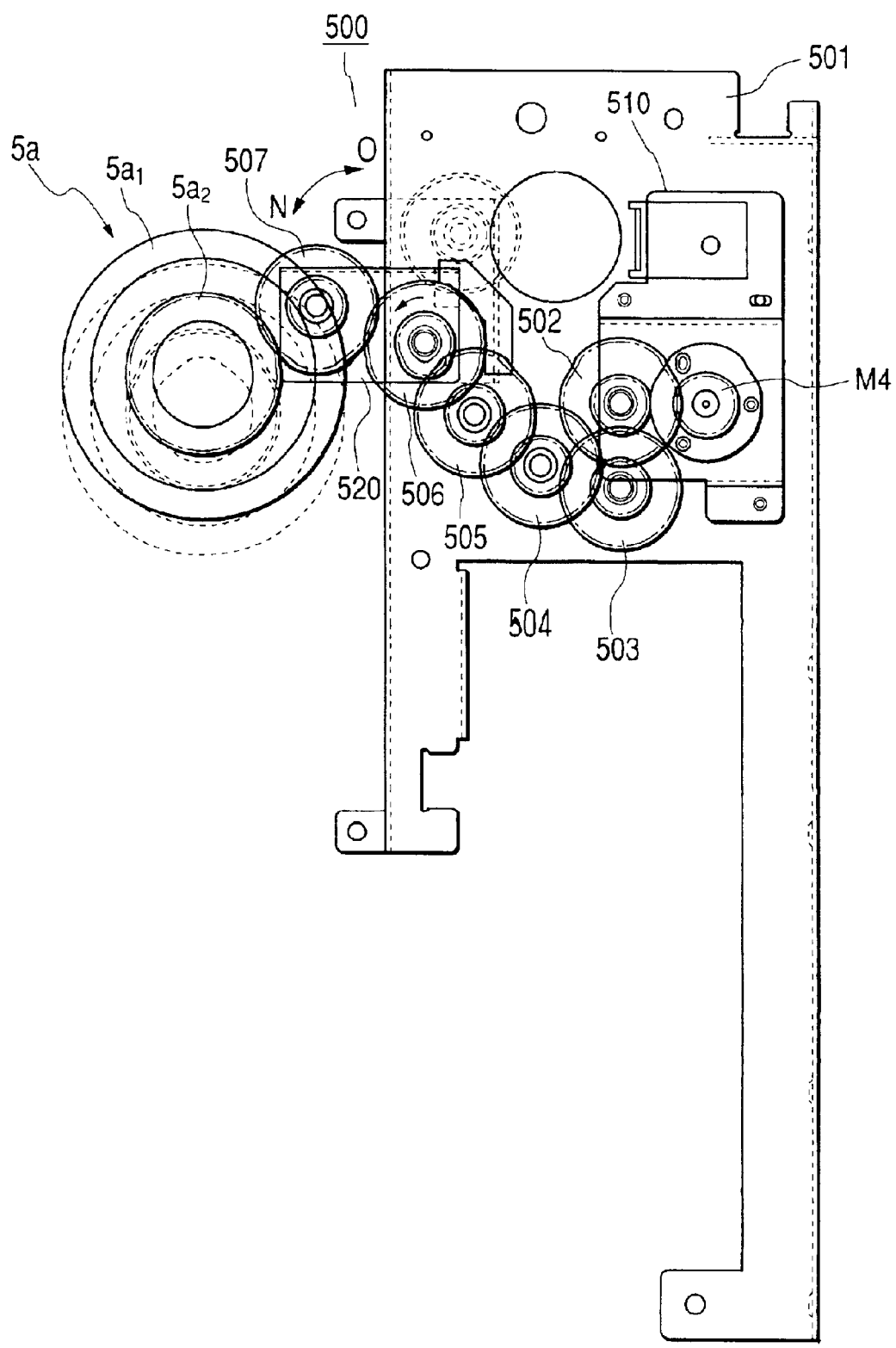
FIG. 9 is a sectional view showing a rotation driving system for the upper fixing roller of the laminating apparatus according to the embodiment of the present invention.
Figure 10:
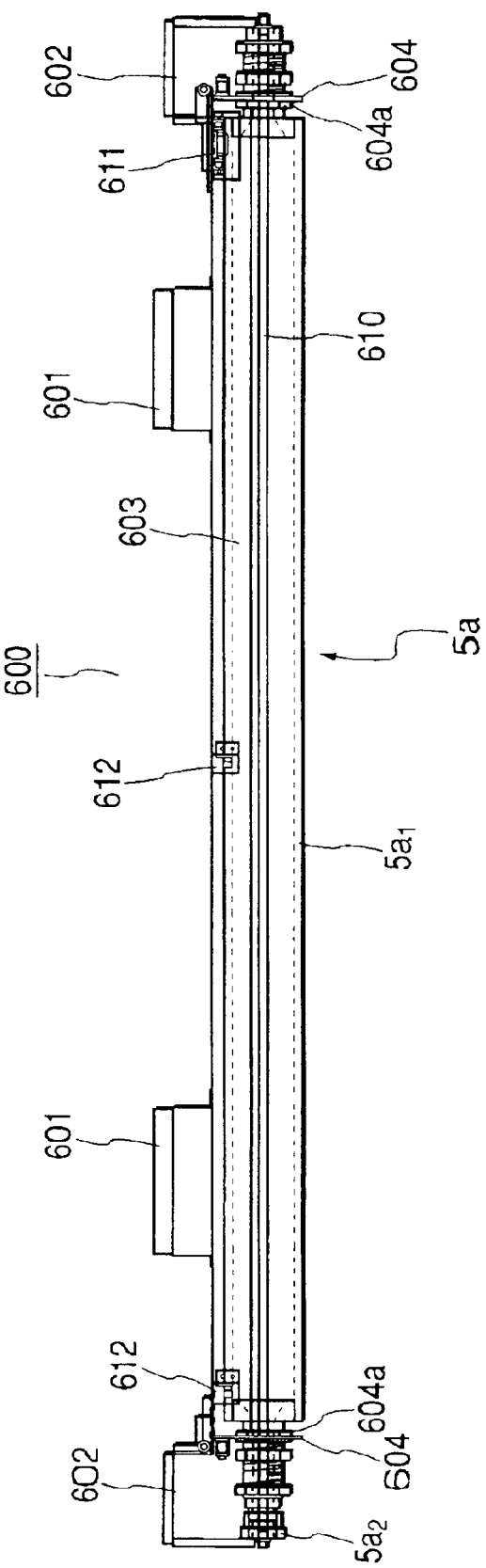
FIG. 10 is a rear view showing an upper roller unit of the laminating apparatus according to the embodiment of the present invention.
Figure 11:
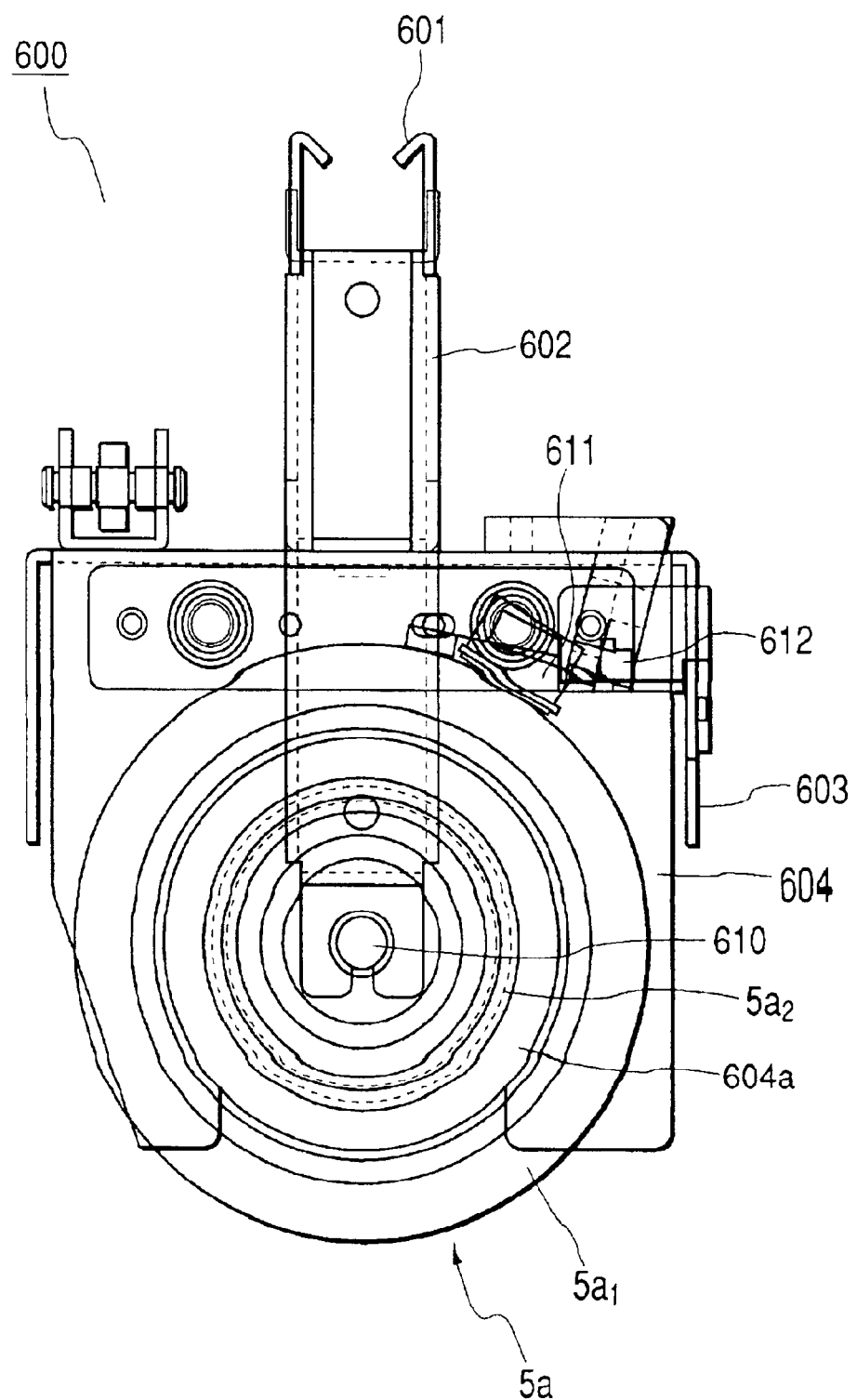
FIG. 11 is a side view showing the upper roller unit of the laminating apparatus according to the embodiment of the present invention.

Next, a construction of the fixing roller pair 5 will be fully explained with reference to the accompanying drawings. FIG. 7 is a side view showing a pressing mechanism for the upper fixing roller, FIG. 8 is a rear view of FIG. 7, FIG. 9 is a sectional view showing a rotation driving system for the upper fixing roller, FIG. 10 is a side view showing an upper fixing roller unit, and FIG. 11 is a side view of FIG. 10.

As mentioned above, the fixing roller pair 5 which is a pair of rollers constituting the fixing means includes the upper fixing roller 5a and the lower fixing roller 5b and serves to form the laminated article 104 by heating and pressurizing the record medium 101 and the film 102.

The upper fixing roller 5a can be shifted in directions shown by the arrows L, M in FIG. 4, so that, in the fixing, the roller 5a is shifted in the direction M to be urged against the lower fixing roller 5b, and, in non-fixing, the roller 5a is shifted in the direction L to be spaced apart from the lower fixing roller 5b, thereby releasing the load on the film 102. Further, when the upper fixing roller 5a is shifted in the direction L, the roller 5a abuts against a cleaning pad 16 shown in FIG. 4, thereby effecting surface cleaning.

As shown in FIG. 7, a pressing mechanism 400 for effecting the shifting movement of the upper fixing roller 5a includes a pressing arm 401 rotatable around a fulcrum 402 (for example, comprising a pin or a bolt) at its one end. A spring 403 connected to the other end of the pressing arm 401 and always biasing the pressing arm 401 downwardly is attached to a bolt 409 via a fulcrum 408.

By securing the fulcrum 408 to the main body 100, the pressing arm 401 is always biased downwardly by the spring 403. An upper part, the other end of the pressing arm 401 is rotatably connected to a pressing bracket 405 via a rotary shaft 407. A spring 406 for always biasing the pressing arm 401 downwardly is disposed in a compressed condition between the pressing bracket 405 and the pressing arm 401, and the spring 406 urges (or pressurizes) the pressing arm 401 downwardly as the pressing bracket 405 is lowered.

Cam brackets 410 are disposed above the pressing bracket 405, and a cam shaft 411 and a cam 412 within the cam brackets 410 constitute an eccentric cam. As shown in FIG. 8, a third drive controlling unit 420 is provided on the cam shaft 411 and has a motor M3 connected to the controller (not shown).

The motor M3 drives the cam shaft 411 by driving a worm wheel 424 via drive gears 421, 422, 423. Further, the third drive controlling unit 420 is integrally formed with a bearing 425 of the cam shaft 411. The cam shaft 411 is secured to the main body 100 via a fixing table (not shown). Further, the cam brackets 410 are disposed on both ends of the cam shaft 411. That is to say, the pressing mechanisms 400 including the cam brackets 410 are provided on both ends of the sides of the main body 100.

As shown in FIG. 7, the upper fixing roller 5a is disposed in the vicinity of the center of the pressing arm 401. On the other hand, when the cam shaft 411 driven by the motor M3 of the third drive controlling unit 420 rotates the cam 412, the cam brackets 410 are pushed upwardly. In this case, the pressure of the compressed spring 406 is released. Accordingly, when the cam brackets 410 are shifted upwardly, the pressing bracket 405 and the pressing arm 401 are shifted upwardly in opposition to the biasing force of the spring 403.

When the cam brackets 410 are shifted downwardly, the pressing bracket 405 and the pressing arm 401 are shifted downwardly by the biasing force of the spring 403, and, by pressing the spring 406 in the compressing direction by means of the cam 412, a downward pressing force can be obtained. That is to say, the pressing force of the fixing roller pair is the sum of the downward tension force of the spring 403 and a reaction force of the compression spring generated when the spring 406 is pressed by the cam 412. As mentioned above, by the driving of the third drive controlling unit 420, the upper fixing roller 5a can be shifted in the direction L, M (refer to FIG. 4) while receiving the downward force.

As shown in FIG. 9, a fourth drive controlling unit 500 for driving the upper fixing roller 5a includes a motor substrate 510 attached to a substrate 501 secured to the main body 100, and a rotary plate 520. A motor M4 connected to the controller (not shown) is mounted on the motor substrate 510, and the motor M4 drives the upper fixing roller 5a via a drive gear 502 provided on the motor substrate 510, drive gears 503, 504, 505 provided on the substrate 501 and drive gears 506, 507 provided on the rotary plate 520.

The rotary plate 520 can be rotated in directions N, O around a shaft of the drive gear 506, so that, when rotated in the direction N, a drive gear $5a_2$ provided on the upper fixing roller 5a is engaged by the drive gear 507. Only when the upper fixing roller 5a is shifted upwardly, such engagement is achieved; whereas, when the roller is shifted downwardly, the drive gear $5a_2$ is disengaged from the drive gear 507, thereby preventing rotation. That is to say, when the roller is shifted downwardly, the roller is driven to follow the lower fixing roller 5b. Further, when shifted in the direction O, the rotary plate 520 and the drive gear 507 are shifted to positions where they do not interfere with the upper fixing roller unit 600 including the upper fixing roller 5a when such a unit is removed from the apparatus along an upward direction, as shown by the broken line.

When the drive gear 506 is rotated in the direction shown by the arrow, a predetermined friction force is generated between the drive gear 506 and the rotary plate 520, and, when the drive gear 506 is rotated by driving the motor M4, the rotary plate 520 situated in the broken line position is biased toward the direction N due to such a friction force, so as to be rotated, thereby engaging the drive gear 507 by the upper fixing roller 5a. Namely, when the laminating apparatus 1 is used, the fourth drive controlling apparatus 500 is always engaged by the upper fixing roller 5a.

As shown in FIGS. 10 and 11, the upper fixing roller unit 600 includes the upper fixing roller 5a, and, as mentioned above, the upper fixing roller 5a includes a surface layer $5a_1$, bearing portions each having a diameter smaller than that of the surface layer $5a_1$, arranged on both ends, and the drive gear $5a_2$ arranged at one end. Above the upper fixing roller 5a, a roller case 603 covers about a half of the upper fixing roller, and two grips 601 are provided on an upper surface of the roller case 603.

Roller support plates 604 are arranged on both ends of the roller case 603, and both ends of the upper fixing roller 5a and the drive gear $5a_2$ are supported by the roller support plates 604 via bearings 604a, thereby supporting the entire upper fixing roller 5a. Further, heater support portions 602 are arranged on both ends of the roller case 603 at sides of the roller support plates 604. A heater 610 as a heat source is disposed at the center of the upper fixing roller 5a, and both ends of the heater is supported by the heater support portions 602.

A thermo-switch 611 for stopping current to be supplied to the heater if the heater 610 is running excessively is disposed at one end of a space between an inner surface of the roller case 603 and the upper fixing roller 5a, and thermistors 612 for measuring a temperature are arranged at a center and at the other end. Incidentally, a cleaning pad 16 (refer to FIG. 4) for contacting with the entire axial area of the surface layer $5a_1$ of the upper fixing roller 5a is disposed not so as to be overlapped with the thermo-switch 611 and the thermistors 612 between the inner surface of the roller case 603 and the upper fixing roller 5a and so as to allow insertion thereof through gap (not shown) of the roller case 603.

The upper fixing roller unit 600 can be removed from the upward direction by opening a cover 23 on the main body 100 and can easily be removed by grasping the grip 601. Further, when the unit is removed, the upper fixing roller unit 600 can be removed, by shifting the rotary plate 520 of the fourth drive controlling unit 500 in the direction O.

For example, maintenance is finished, and, when the upper fixing roller unit 600 is inserted through the cover 23, the upper fixing roller 5a is positioned. Further, as mentioned above, when the laminating apparatus 1 is driven, the rotary plate 520 is driven in the direction N, with the result that the fourth drive controlling unit 500 is automatically engaged by the upper fixing roller 5a.

Figure 12:
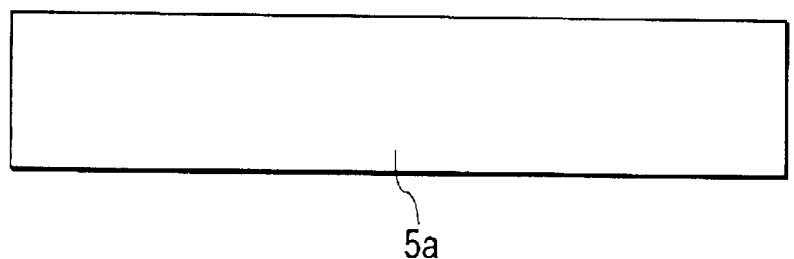
FIG. 12 is a schematic front view for explaining a configuration of the upper fixing roller of the laminating apparatus according to the embodiment of the present invention.

Next, configurations of the upper fixing roller 5a, lower fixing roller 5b and main convey roller 7a will be explained with reference to the accompanying drawings. FIG. 12 is a schematic front view for explaining a configuration of the upper fixing roller, FIG. 13 is a schematic front view for explaining a configuration of the lower fixing roller, and FIG. 14 is a schematic front view for explaining a configuration of the main convey roller.

As shown in FIG. 12, the upper fixing roller 5a is formed as a cylindrical form having substantially the same diameter from both ends of the center. As show in FIG. 13, the lower fixing roller 5b is formed as barrel shape including a central portion having a diameter greater than those of end portions. As shown in FIG. 14, the main convey roller 7a is formed as a hand drum shape including a central portion having a diameter smaller than those of end portions.

Figure 13:
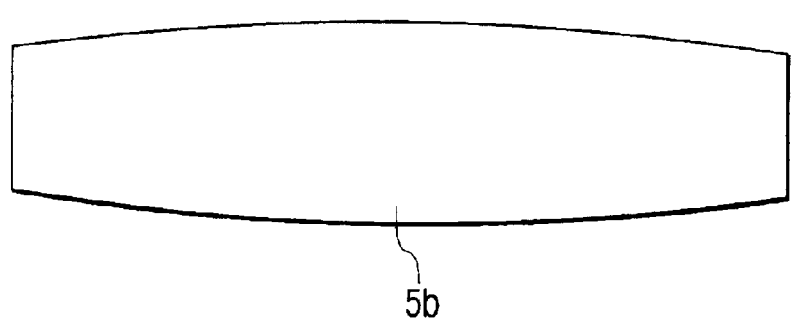
FIG. 13 is a schematic front view for explaining a configuration of a lower fixing roller of the laminating apparatus according to the embodiment of the present invention.
Figure 14:
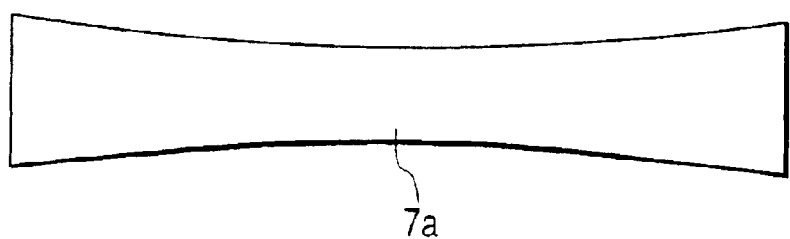
FIG. 14 is a schematic front view for explaining a configuration of a main conveying roller of the laminating apparatus according to the embodiment of the present invention.

Incidentally, the roller configurations shown in FIGS. 12, 13 and 14 are shown in an exaggerated manner for explanation's sake, and, particularly, the lower fixing roller 5b and the main convey roller 7a are formed as the barrel shape or the hand drum shape in which the central portion differs from the end portions by a predetermined amount (for example, 0.5 mm to 2.0 mm).

Since both ends of each roller are supported, the entire roller is flexed downwardly by its own weight to generate a concave central portion. Thus, in the fixing roller pair 5, for example, if the upper fixing roller 5a and the lower fixing roller 5b are formed to have the same diameter, when the record medium 101 and the film 102 are fixed together by pressure and heat, unevenness occurs between the central portion and the end portions. To avoid this, by forming the lower fixing roller 5b as a predetermined barrel shape, the record medium 101 and the film 102 can be pressurized and heated substantially uniformly to thereby achieve optimum fixing.

On the other hand, in the main convey roller 7a, when the predetermined tension is applied to the laminated article 104 between the fixing roller pair 5 and the convey roller pair 7, for example, if the main convey roller 7a is formed as a same diameter cylinder or a barrel shape, the tension on the central portion of the laminated article 104 will become greater than those on the both ends, with the result that wrinkles may be generated at the vicinity of both end portions during the fixing by heat and pressure. To avoid this, by forming the main convey roller 7a as the predetermined hand drum shape, substantially uniform tension can be applied to the laminated article 104. Further, by selecting the configurations of the rollers in this way, generation of wrinkles can be prevented.

Next, a construction of the cutter will be explained with reference to FIGS. 15A and 15B. FIGS. 15A and 15B show a cutter portion 700, where FIG. 15A is a plan view and FIG. 15B is a rear view. The cutter portion 700 is disposed between the discharge roller pair 8 and the discharge port 61 and includes a cutter holder 701, rails 702 and a fifth drive controlling unit 703.

The cutter holder 701 is provided on a cutter table 710, and a round blade-shaped cutters C1, C2 are arranged within the cutter holder 701. The cutter holder 701 and the cutter table 710 are shiftably rested on the rails 702 arranged along a width-wise direction of the passing film 102 so as to allow the movement in directions shown by the arrows P, Q. For example, when the cutter holder 701 and the cutter table 710 are shifted from positions shown by the solid line to positions shown by the broken line (i.e., by shifting them across the entire width of the film 102), the film 102 can be cut along the width-wise direction. Also, the film can be cut by shifting them in the reversely direction.

On the other hand, the fifth drive controlling unit 703 is disposed below the rails 702 and has a substrate 711 secured to the rails 702. A motor M5 is mounted on a lower surface of the substrate 711 at its one end and is connected to the controller (not shown) via wiring 706. Further, a drive gear 704 and a drive gear 705 are provided on the substrate 711. When the drive gear 704 is rotated by the motor M5, the drive gear 705 is rotated.

A wire 708 supported by pulleys 707 is wound around the drive gear 705, and, the cutter table 710 is connected to the wire 708 at an opposite side of the drive gear 705. With this arrangement, when the drive gear 705 is rotated, the wire 708 is pulled to shift the cutter table 710.

Further, sensors 709 are disposed at both ends to straddle the rails 702 and the substrate 711. The sensors 709 detect the fact that the cutter table 710 is shifted to the direction P or Q to reach the end and send a predetermined signal to the controller (not shown) via wirings 709, 709a.

When the film 102 is cut by the cutter portion 700, first of all, the position of the cutter table 710 (whether left end position or right end position in FIG. 15B) is detected by the sensors 709, and the motor M5 is driven by the controller (not shown) to control the rotational direction thereof.

As a result, the wire 708 is driven in the direction P or Q via the drive gears 704, 705, with the result that the cutter table 710 is shifted from one end to the other end. When the cutter table 710 reaches the other end, the cutter table is detected by the sensor 709 and the predetermined signal is sent to the controller (not shown), thereby stopping the motor M5 via the controller. Namely, the cutter C1 of the cutter holder 701 is shifted from one end to the other end, thereby cutting the film 102 along the width-wise direction.

Next, an operation of the laminating apparatus 1 having the above-mentioned construction will be explained with reference to FIG. 4. The laminating apparatus 1 according to the illustrated embodiment has a unit-of-sheet mode for processing the record media 101 one by one and a repeat mode in which the record media are processed continuously. Here, the operation will be fully described.

First of all, the operation of the laminating apparatus 1 in the unit-of-sheet mode will be explained. When the operator sets one end of the record medium 101 on the feed table 201 of the feed unit 200 and inserts the medium in the direction A, the record medium 101 is supplied into the feed path 71 through the feed port 60. As a result, a leading end of the record medium 101 is detected by the feed sensor 10, and the motor M1 shown in FIG. 6 is driven by the controller (not shown).

Then, the lower feed roller 2a and the upper feed roller 2b contacted with the lower feed roller are driven via the drive gear 3b and the drive gear 3c. When the record medium 101 reaches a nip of the feed roller pair 2, the record medium is conveyed toward the fixing roller pair 5 in the direction B. Further, when the record medium 101 is passed through the feed roller pair 2 and a trailing end of the record medium 101 is detected by the TA sensor 11, the motor M1 is stopped by the controller (not shown), thereby stopping the feed roller pair 2.

On the other hand, when the film set 103 is mounted to the film mounting portion 20, the film 102 is previously supplied up to the cutter portion 700 through the guide roller 4, fixing roller pair 5, convey roller pair 7 and convey roller pair 8, i.e., into the film feed path 70 and the convey path 72.

Further, in this case, the upper fixing roller 5a is situated at an upper position in the direction L, and the film 102 is subjected to predetermined tension by the brake B2 of the center shaft of the film set 103 and the convey roller pair 7, thereby keeping a wrinkle-less condition. Incidentally, although a feeding angle of the film 102 of the film set 103 is changed from the direction C to a direction C' in accordance with a film remaining amount, the angle is adjusted by the guide roller 4 so that the film is supplied to the fixing roller pair 5 at a substantially constant acute angle.

When the fact that the record medium 101 is fed is detected by the TA sensor 11, the controller (not shown) drives the motor M3 of the third drive controlling unit 420 at a timing that the leading end of the record medium 101 reaches the fixing roller pair 5, thereby rotating the cam shaft 411 to urge the pressing arm 401 downwardly via the cam brackets 410, with the result that the upper fixing roller 5a is shifted to the direction M, thereby achieving and fixing a pressing condition against the lower fixing roller 5b (refer to FIGS. 7 and 8). In this case, it is assumed that the heater 610 in the upper fixing roller 5a is heated up to a predetermined set temperature by the controller (refer to FIGS. 10 and 11).

When the leading end of the record medium 101 is supplied to the fixing roller pair 5, the motor M2 of the second drive controlling unit 6 is driven by the controller to drive the fixing roller pair 5, with the result that the fixing roller pair 5 forms the laminated article 104 by fixing the record medium 101 and the film 102 together and conveys the laminated article 104 to the convey roller pair 7 by winding the laminated article around the lower fixing roller 5b by a predetermined angle.

Namely, the record medium 102 is fixed to any section of the continuous film 102, and any section of the film 102 is conveyed as the laminated article 104. Further, as mentioned above, since the lower fixing roller 5b is formed as the barrel shape (refer to FIG. 13), when this roller is urged by the upper fixing roller 5a, the record medium 101 and the film 102 are pressurized substantially uniformly to achieve wrinkle-less fixing. Incidentally, after the fixing, since the laminated article 104 is wound around the lower fixing roller 5b by the predetermined angle, the laminated article is retarded from the heat of the upper fixing roller 5a, thereby preventing the re-heating of the record medium 101.

On the other hand, when the laminated article 104 is conveyed and discharged through the convey path 72 in the direction D by the fixing roller pair 5, convey roller pair 7 and discharge roller pair 8, first of all, the motor M2 of the second drive controlling unit 6 is driven by the controller to rotate the main convey roller 7a, lower fixing roller 5b and upper discharge roller 8a (refer to FIG. 6).

In this case, as mentioned above, since the brake portion 9 is provided on the lower fixing roller 5b, a predetermined braking force is applied to the lower fixing roller 5b by the brake B1, thereby applying predetermined tension between the lower fixing roller 5a and the convey roller pair 7. Further, since the one-way clutch $5b_2$ is disposed between the lower fixing roller 5b and the drive gear $5b_1$ of the roller, even if there is a speed difference between the fixing roller pair 5 and the convey roller pair 7, due to constant braking force, the constant tension is maintained.

Thereafter, when the trailing end of the record medium 101 is detected by the TA sensor 11, the controller drives the motor M3 of the third drive controlling unit 420 at a timing that the trailing end of the record medium 101 is discharged out of the apparatus so as to rotate the cam shaft 411, with the result that, by urging the pressing arm 401 upwardly in opposition to the biasing force of the spring 403 via the cam brackets 410, the upper fixing roller 5a is shifted in the direction L, thereby releasing pressurization of the film 102 (refer to FIGS. 7 and 8).

Further, by shifting the upper fixing roller in the direction L in this way, the upper fixing roller 5a abuts against the cleaning pad 16 and is separated from the film 102 not to be contacted with the film 102. In this case, the upper fixing roller 5a is rotated by the fourth drive controlling unit 500, with the result that the surface of the roller is cleaned by the cleaning pad 16.

On the other hand, the main convey roller 7a of the convey roller pair 7 conveys the laminated article 104 to the discharge roller pair 8 while winding the laminated article by the predetermined angle. In this case, as mentioned above, since it is formed as the hand drum shape (refer to FIG. 14), the laminated article 104 is conveyed while pulling the end portions thereof stronger than the central portion thereof due to a difference in circumferential length between the central portion and the end portions.

Consequently, width-wise tension can be applied to the laminated article 104, with the result that the laminated article 104 can be conveyed to the discharge roller pair 8 while preventing the wrinkles from being generated at both end portions when the laminated article 104 is fixed by the fixing roller pair 5. Incidentally, guide members 32, 33, 34 are arranged within the convey path from the fixing roller pair 5 to the discharge roller pair 8, so that, when the film set 103 is mounted and the leading end of the film 102 is conveyed up to the vicinity of the discharge roller pair 8, jam and the like can be prevented.

The exit sensor 15 disposed in the vicinity of the discharge port 61 detects whether the passing portion is the portion of the laminated article 104 (fixed record medium 101 and film 102) or the portion of the film 102 (on which the record medium 101 does not exist) or whether both the record medium 101 and the film 102 do not exist or not.

The controller (not shown) drives the cutter portion 700 on the basis of the detection result, and, the trailing end of the section of the laminated article 104 existing in any section of the continuous film 102 is passed through the cutter portion, only the section of the film 102 is cut by the cutter C1 of the cutter portion 700.

Consequently, the laminated article 104 is separated from the continuous film 102 and is discharged from the discharge port 61 onto the discharge tray 62. Incidentally, when the remaining amount of the film in the film set 103 becomes small and the trailing end of the continuous film 102 is passed through the photo-sensor 12 or the exit sensor 15, or, for example, if the film 102 does not exist on the photo-sensor 12 or the exit sensor 15 due to occurrence of jam and the like, the detection result is sent to the controller (not shown) and is displayed on display means (not shown) of the operation unit 50.

Next, the operation of the laminating apparatus 1 in the repeat mode will be explained. Incidentally, since the operation in the repeat mode is substantially similar to the operation of the unit-of-sheet mode, only characteristic portions will be described.

When a first record medium 101 is inserted from the feed unit 200 into the feed port 60, the first record medium 101 is detected by the feed sensor 10, with the result that the feed roller pair 2 is driven by the first drive controlling unit 3, thereby supplying the record medium to the fixing roller pair 5. On the other hand, the film 102 is previously supplied from the film set 103 up to the vicinity of the discharge port 61. When the leading end of the record medium 101 is supplied to the fixing roller pair 5, the record medium 101 and the film 102 are fixed together by the fixing roller pair 5, thereby forming the laminating article 104 by the continuous film 102 and the record medium 101. Further, the lower fixing roller 5b, convey roller pair 7 and convey roller pair 8 are driven by the second drive controlling unit 6 to convey the laminated article 104.

In the repeat mode, when the trailing end of the record medium 101 is passed through the TA sensor 11, the first drive controlling unit 3 is stopped, and the second drive controlling unit 6 is stopped at a timing that the trailing end of the record medium 101 has been passed through the fixing roller pair 5. As a result, the first laminated article 104 remains in the convey path 72.

Thereafter, when a second record medium 101 is inserted into the feed port 60 and the record medium 101 is detected by the feed sensor 10, the driving of the first drive controlling unit 3 is started. When the leading end of the second record medium 101 is detected by the TA sensor 11, the driving of the second drive controlling unit 3 is started. Then, the second record medium 101 is supplied to the fixing roller pair 5, and the fixing of the film 102 with respect to the second record medium 101 is started from a portion of the continuous film 102 spaced apart from the trailing end of the first laminated article 104 by a predetermined distance, and the first laminated article 104 is conveyed toward the discharge port 61.

Incidentally, in this case, the convey roller pair 7 is driven by the second drive controlling unit 6 before the leading end of the second record medium 101 reaches the fixing roller pair 5. Thus, the section of the film 102 alone is formed between the first laminated article 104 and the second laminated article 104.

When the first laminated article 104 is conveyed on the exit sensor 15 and the trailing end thereof is passed through the sensor, the exit sensor 15 detects the section of the film 102 alone. As a result, the cutter portion 700 is driven by the controller (not shown), thereby cutting the section of the film 102 alone by the cutter C1. In this way, the first laminated article 104 is separated from the continuous film 102 and is discharged from the discharge port 61 onto the discharge tray 62.

On the other hand, when the trailing end of the second record medium 101 is detected by the TA sensor 11, the first drive controlling unit 3 is stopped, and the second drive controlling unit 6 is stopped at a timing that the trailing end of the second record medium 101 has been passed through the fixing roller pair 5. Thereafter, by repeating the above-mentioned operations, a plurality of laminated articles 104 are formed continuously.

Incidentally, when the film 101 is cut, the first laminated article 104 is cut from the continuous film 102 by shifting the cutter C1 of the cutter portion 700 (refer to FIGS. 15A and 15B) from the direction P to the direction Q, and the second laminated article 104 is cut from the continuous film 102 by shifting the cutter from the direction Q to the direction P. Such operations are repeated to cut the laminated articles.

Further, since the laminated article 104 is cut while being discharged, the cut edge is inclined with respect to the conveying direction of the laminated article 104. Further, in the laminated article 104 so cut, the base material is peeled from the fixed latex layer as mentioned above (and shown in FIGS. 16A to 16D) in the later peeling step.

In this way, by providing the repeat mode in which the preceding record medium 101 is waited in the condition that it leaves the fixing roller pair 5 after the film 102 is fixed to the record medium, and the next record medium 101 and the film 102 are fixed together while discharging the preceding record medium 101 from the discharge port 61 immediately before the leading end of the next record medium 101 reaches the fixing roller pair 5, the film can be used efficiently. Further, by doing so, problems regarding reduction of cost and savings of the resources can be solved.

Incidentally, the above-mentioned mode is a repeat+cut mode among the repeat modes, and the repeat mode also has a mode in which the cutting by the cutter C1 is not effected and a continuous laminated article 104 is discharged.

Figure 17:
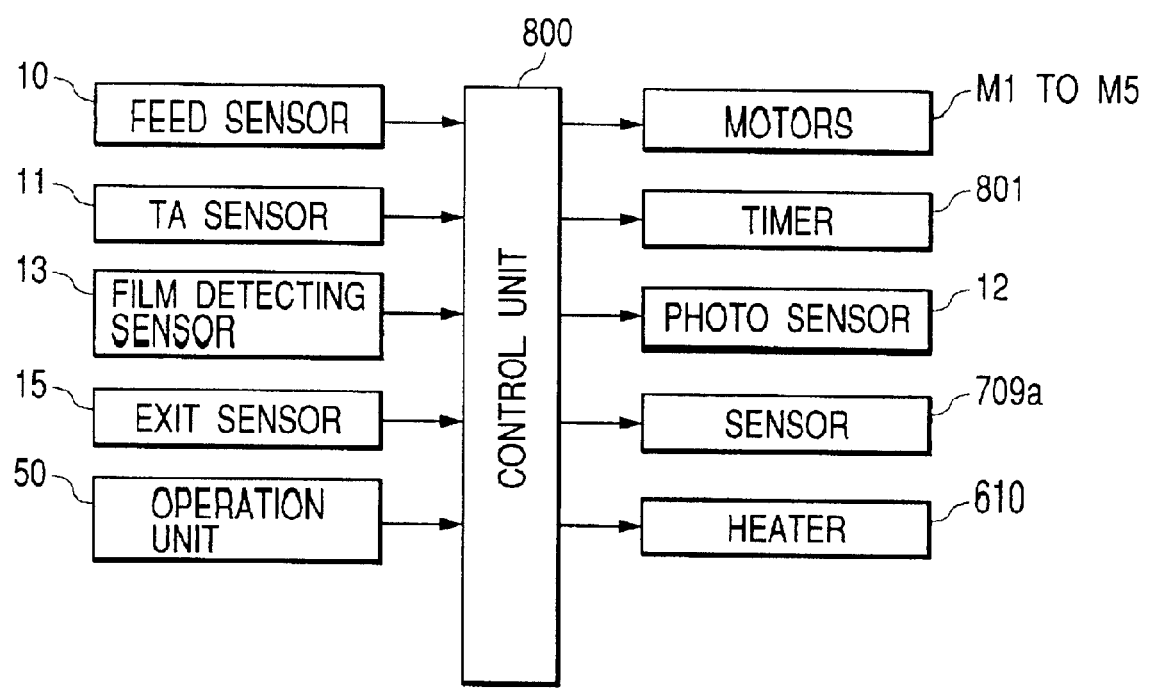
FIG. 17 is a view showing a control block of the laminating apparatus according to the embodiment of the present invention.

By the way, FIG. 17 is a view showing a control block of the laminating apparatus having the above-mentioned arrangement. In FIG. 17, a controller 800 serves to receive the detection signals from the sensors 10 to 13, 15, 709a.

By driving the motors M1 to M5 on the basis of the detection signals from the various sensors 10 to 13, 15, 709a, there are controlled a first feeding step for feeding the record medium 101 to the fixing roller pair 5 into which the rolled film 102 is being introduced, a fixing step for heating and pressurizing the film against a recorded image side of the record medium 101 by the fixing roller pair 5 and for conveying the film until the trailing end of the film leaves the fixing roller pair, a waiting step for stopping conveyance of the fixed record medium 101 and film 102 in the condition that the trailing end of the fixed record medium 101 and film 102 leaves the fixing roller pair 5, and thus being waited there, a second feeding step for feeding the next record medium in the waiting condition, and a discharging step for fixing the next record medium by the fixing roller pair 5, for conveying the fixed record medium 101 and film 102 in the waiting condition and for cutting the film and discharging it in a conveying condition.

Incidentally, in FIG. 17, the controller 800 serves to drive the motors M1 to M5 on the basis of count information from a timer 801. For example, in the repeat+cut mode, as shown in a flow chart in FIG. 18 and a timing chart in FIG. 19, after the trailing end of the record medium 101 is detected by the TA sensor 11, the motor M2 is stopped on the basis of the information from the timer (after $T_1$ sec), and the record medium 101 is stopped at the waiting position.

Further, the next record medium 101 enters into a settable condition, and, thereafter, when the next record medium 101 is set and is detected by the feed sensor 10, the motor M1 is rotated (ON) to drive the feed roller pair 2. Thereafter, when the leading end of the record medium 101 is detected by the TA sensor 11, the motor M2 is driven on the basis of the information from the timer 801 (after $T_2$ sec).

Then, the motor M3 is turned ON and continues to be driven until the fixing roller pair 5 is urged together (after $T_3$ sec), and, when the trailing end of the record medium 101 is detected by the TA sensor 11, the motor M1 is turned OFF to stop the feed roller pair 2.

Thereafter, the motor M5 is driven on the basis of the count information from the timer 801 (after $T_4$ sec) after the trailing end of the record medium is detected by the TA sensor 11, thereby effecting the cutting operation with respect to the laminated article 104. Thereafter (after $T_5$ sec), the motor M2 is stopped, and the fixing roller pair 5 is released (spaced apart).

Figure 20:
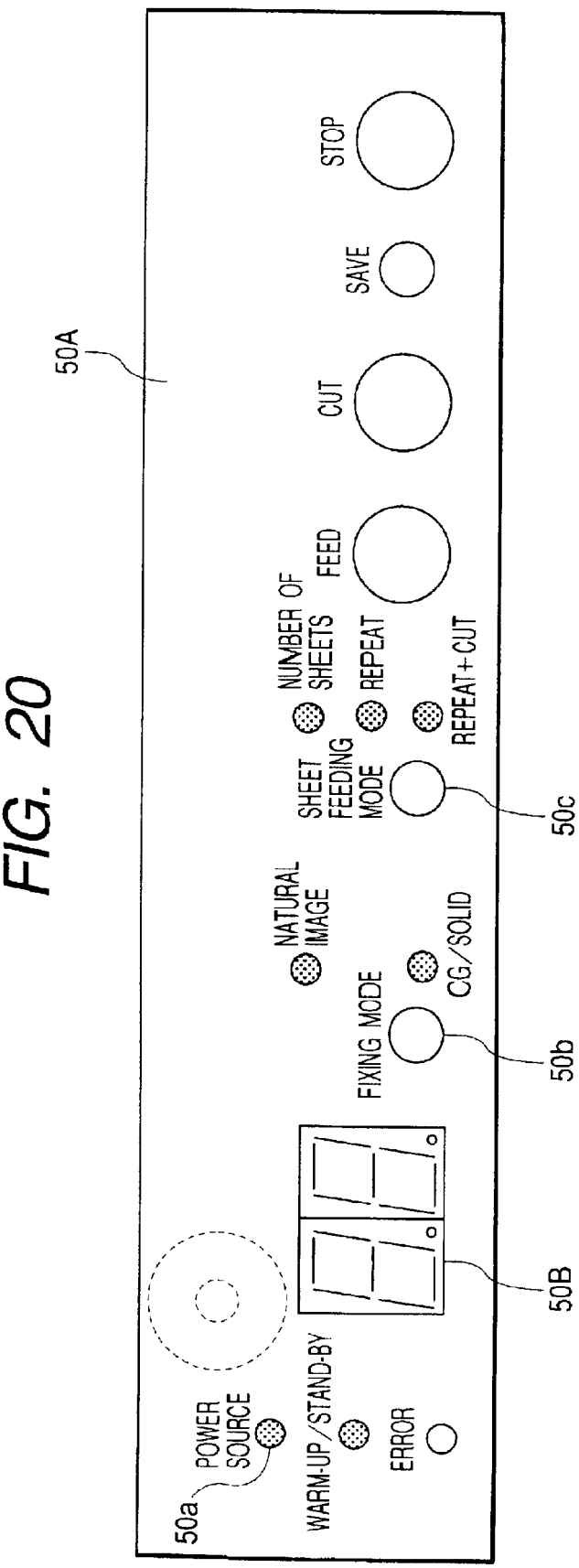
FIG. 20 is a view showing a construction of an operation unit of the laminating apparatus according to the embodiment of the present invention.

FIG. 20 is a view showing a construction of the operation unit 50. As shown in FIG. 20, the operation unit 50 has an operation panel 50A including various buttons such as a fixing mode setting button 50b and a sheet feeding mode switching button 50c as switching means for switching between unit-of-sheet mode, repeat mode and repeat+cut mode, a power source display portion 50a, and lamps for displaying the set mode (unit-of-sheet mode, repeat mode or repeat+cut mode).

Further, in FIG. 20, the reference numeral 50B denotes 7-segment display means provided on the operation panel 50A. The display means 50B serves to display the number of sheets, a warm-up condition of the fixing means, the fixing operation, and the record medium leading end passing conditions by the first sensor (feed sensor 10 and TA sensor 11).

Figure 21A:
FIGS. 21A, 21B and 21C are views displaying operations of display means provided in the operation unit.
Figure 21B:
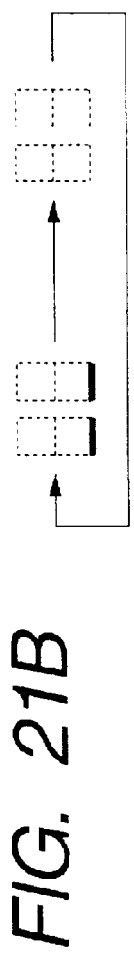
Figure 21C:
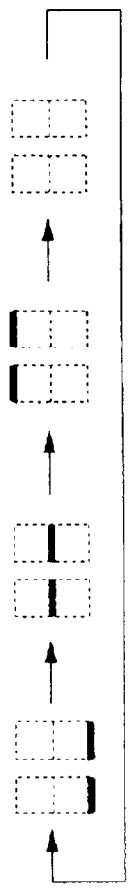

FIGS. 21A to 21C show displaying operations of the display means 50B. Incidentally, FIG. 21A shows a temperature of the upper fixing roller 5a. When the temperature of the upper fixing roller 5a is increased, the display of the display means 50B is gradually shifted from a left-most condition that only one segment is lighted to rightward conditions that many segments are lighted.

Further, FIG. 21B displays the operation upon detection of the leading end of the record medium during the fixing operation. When the record medium is detected, the segment is lighted. Further, FIG. 21C displays the fixing operation. When the fixing operation is started, the lowermost segment is lighted, and, when the fixing operation is continued, the central segment is then lighted and the uppermost segment is ultimately lighted. Incidentally, thereafter, when the fixing operation is finished, the segments are OFF.

As mentioned above, by providing the repeat mode in which the preceding record medium is waited in the condition that it leaves the fixing means after the film is fixed to the record medium, and the next record medium and the film are fixed together while discharging the preceding record medium from the discharge port before the leading end of the next record medium reaches the fixing means, the film can be used efficiently.

What is claimed is:

1. A laminating apparatus for laminating a film on a record medium, comprising:

fixing means for fixing a film onto a front side of a record medium;

feed means for feeding the record medium to said fixing means;

film introducing means for directing the film to said fixing means;

conveying means for conveying toward a discharge port the record medium and the film which are fixed together by said fixing means;

a cutter disposed between said conveying means and the discharge port and adapted to cut the film; and a control unit configured to have a repeat mode in which said apparatus shifts to a waiting condition where said film introducing means and said conveying means are stopped so that a preceding record medium is stopped at a position where it leaves said fixing means, said position located upstream of the discharge port in said apparatus, while said feed means is driven to feed a succeeding record medium toward said fixing means, and then said film introducing means, said conveying means and said fixing means are driven again before a leading end of the succeeding record medium reaches said fixing means, while the succeeding record medium and the introduced film are fixed together as discharging the preceding record medium from the discharge port.

2. A laminating apparatus according to claim 1, wherein, in the repeat mode, said control unit controls said cutter to cut the fixed preceding record medium and film in a conveying condition.

3. A laminating apparatus according to claim 2, further comprising a second sensor disposed at a downstream side of said fixing means, wherein said second sensor has a first condition for detecting the fixed record medium and film portion, a second condition for detecting a film portion on which the record medium does not exist, and a third condition for detecting the fact that both the record medium and the film do not exist.

4. A laminating apparatus according to claim 1, further comprising a first sensor for detecting the record medium between said feed means and said fixing means, wherein said control unit starts driving of said fixing means and said conveying means when a predetermined time period is elapsed after the leading end of the record medium is detected by said first sensor, and stops the driving of said fixing means and said conveying means when a predetermined time period is elapsed after a trailing end of the record medium is detected by said first sensor, to thereby achieve a waiting condition.

5. A laminating apparatus according to claim 4, wherein said fixing means includes a pair of rollers for pressurizing and heating the record medium and the film, and one of said rollers is provided with a heat source and can be shifted to be spaced apart from the other roller and, in the waiting condition, said one of the rollers of said fixing means is spaced apart from the other roller not to be contacted with the film.

6. A laminating apparatus according to claim 4, further comprising a second sensor disposed at a downstream side of said fixing means, wherein said second sensor has a first condition for detecting the fixed record medium and film portion, a second condition for detecting a film portion on which the record medium does not exist, and a third condition for detecting the fact that both the record medium and the film do not exist.

7. An apparatus according to claim 5, further comprising cleaning means for cleaning a surface of said roller, wherein in the waiting condition, said one roller shifted in a direction away from the other roller and abuts against said cleaning means to have its surface cleaned by said cleaning means.

8. A laminating apparatus according to claim 1, wherein said fixing means includes a pair of rollers for pressurizing and heating the record medium and the film, and one of said rollers is provided with a heat source and can be shifted to be spaced apart from the other roller and, in the waiting condition, said one of the rollers of said fixing means is spaced apart from the other roller not to be contacted with the film.

9. A laminating apparatus according to claim 8, further comprising a second sensor disposed at a downstream side of said fixing means, wherein said second sensor has a first condition for detecting the fixed record medium and film portion, a second condition for detecting a film portion on which the record medium does not exist, and a third condition for detecting the fact that both the record medium and the film do not exist.

10. An apparatus according to claim 9, further comprising cleaning means for cleaning a surface of said roller, wherein in the waiting condition, said one roller shifted in a direction away from the other roller and abuts against said cleaning means to have its surface cleaned by said cleaning means.

11. An apparatus according to claim 8, further comprising cleaning means for cleaning a surface of said roller, wherein in the waiting condition, said one roller shifted in a direction away from the other roller and abuts against said cleaning means to have its surface cleaned by said cleaning means.

12. A laminating apparatus according to claim 1, wherein said control unit includes a unit-of-sheet mode in which the record medium is fed by said feed means and the record medium and the introduced film are fixed together by said fixing means, and the fixed record medium and film are conveyed by said conveying means and cut by said cutter to be discharged from the discharge port.

13. A laminating apparatus according to claim 1, further comprising a second sensor disposed at a downstream side of said fixing means, wherein said second sensor has a first condition for detecting the fixed record medium and film portion, a second condition for detecting a film portion on which the record medium does not exist, and a third condition for detecting the fact that both the record medium and the film do not exist.

14. An apparatus according to claim 1, wherein the record medium stopped in the waiting condition is fixed to the film at an upstream side of said cutter, and is cut off after the fixing of the film to the next record medium is started.

15. An image forming apparatus comprising:

a recording apparatus for recording an image on a record medium by using a recording head; and a laminating apparatus for laminating a film onto the record medium on which the image was recorded by said recording apparatus, said laminating apparatus including, a record medium supply portion to which the record medium discharged from said recording apparatus is supplied, fixing means for fixing the film onto a front surface of the record medium, feed means for feeding the record medium to said fixing means, film introducing means for directing the film to said fixing means, conveying means for conveying the record medium and the film which are fixed together by said fixing mean toward a discharge port, a cutter disposed between said conveying means and said discharge port and adapted to cut the film, and a control unit configured to have a repeat mode in which said apparatus shifts to a waiting condition where said film introducing means and said conveying means are stopped so that a preceding record medium is stopped at a position where it leaves said fixing means, said position located upstream of the discharge port in said apparatus, while said feed means is driven to feed a succeeding record medium toward said fixing means, and then said film introducing means, said conveying means and said fixing means are driven again before a leading end of the succeeding record medium reaches said fixing means, while the succeeding record medium and the introduced film are fixed together while discharging the preceding record medium from the discharge port.

16. An image forming apparatus according to claim 15, wherein said recording apparatus is an ink jet recording apparatus.

* * * * *

UNITED STATES PATENT AND TRADEMARK OFFICE
CERTIFICATE OF CORRECTION

PATENT NO. : 6,769,466 B2
DATED : August 3, 2004
INVENTOR(S) : Kiyotaka Osumi et al.

Figure 18:
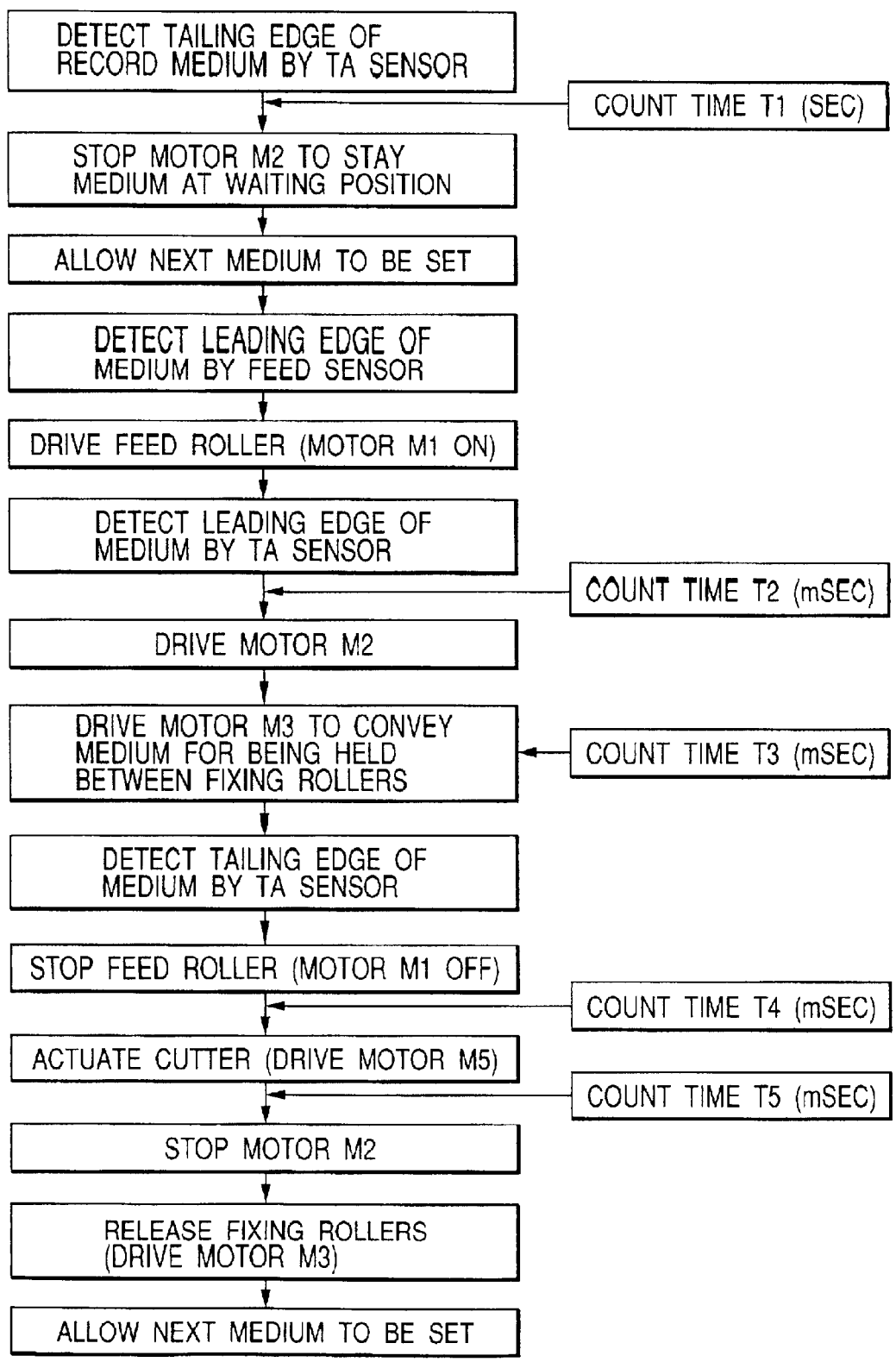
FIG. 18 is a flow chart for explaining control in a "repeat+cut" mode of a control unit of the laminating apparatus according to the embodiment of the present invention.
Figure 19:
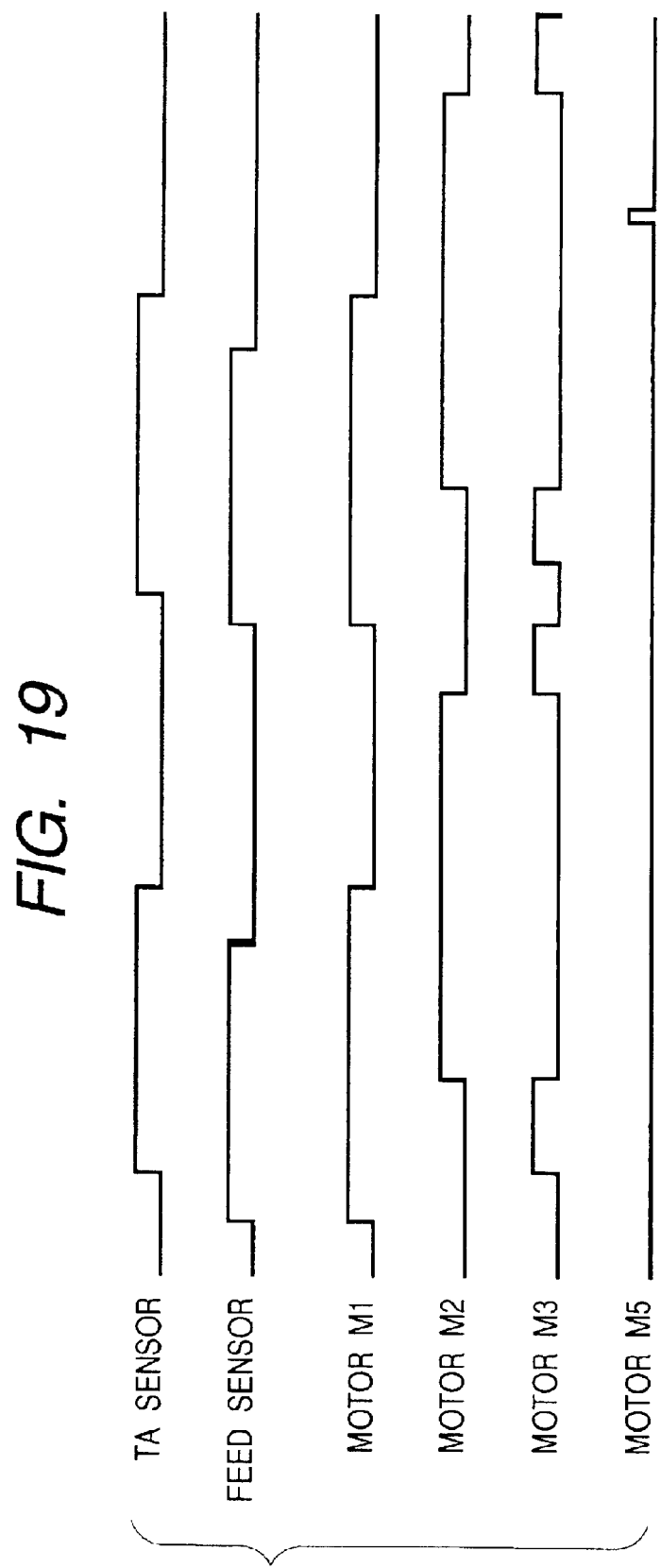
FIG. 19 is a timing chart for explaining the control in the "repeat+cut" mode of the control unit of the laminating apparatus according to the embodiment of the present invention.

It is certified that error appears in the above-identified patent and that said Letters Patent is hereby corrected as shown below:

Drawings,
Sheet 16, FIG. 18, "TAILING" (both occurrences) should read -- TRAILING --.

Column 11,
Line 27, "reversely" should read -- reverse --.

Column 18,
Line 61, "mean" should read -- means --.

Signed and Sealed this

Fifteenth Day of February, 2005

JON W. DUDAS
*Director of the United States Patent and Trademark Office*